(12) United States Patent
Maeno

(10) Patent No.: US 11,019,456 B2
(45) Date of Patent: May 25, 2021

(54) GUIDANCE ASSISTANCE APPARATUS, GUIDANCE ASSISTANCE METHOD, AND STORAGE MEDIUM FOR STORING PROGRAM

(71) Applicant: NEC CORPORATION, Tokyo (JP)

(72) Inventor: Yoshiharu Maeno, Tokyo (JP)

(73) Assignee: NEC CORPORATION, Tokyo (JP)

( * ) Notice: Subject to any disclaimer, the term of this patent is extended or adjusted under 35 U.S.C. 154(b) by 110 days.

(21) Appl. No.: 16/546,613

(22) Filed: Aug. 21, 2019

(65) Prior Publication Data

US 2019/0380003 A1    Dec. 12, 2019

Related U.S. Application Data

(63) Continuation of application No. 16/085,231, filed as application No. PCT/JP2017/009203 on Mar. 8, 2017, now Pat. No. 10,893,380.

(30) Foreign Application Priority Data

Mar. 16, 2016    (JP) .................................. 2016-051772

(51) Int. Cl.
*H04W 4/024* (2018.01)
*G08G 1/005* (2006.01)
(Continued)

(52) U.S. Cl.
CPC ........ *H04W 4/024* (2018.02); *G01C 21/3415* (2013.01); *G01C 21/3641* (2013.01);
(Continued)

(58) Field of Classification Search
CPC ......... H04W 4/024; H04W 4/90; H04W 4/02; G08G 1/096866; G08G 1/096844;
(Continued)

(56) References Cited

U.S. PATENT DOCUMENTS 6,118,389 A    9/2000 Kamada et al.
6,321,161 B1    11/2001 Herbst et al.
(Continued)

FOREIGN PATENT DOCUMENTS

JP    2006-047274 A    2/2006
JP    2010-244407 A    10/2010
JP    2011-034352 A    2/2011

OTHER PUBLICATIONS

International Search Report of PCT/JP2017/009203 dated Jun. 6, 2017.
(Continued)

*Primary Examiner* — Mazda Sabouri
(74) *Attorney, Agent, or Firm* — Sughrue Mion, PLLC

(57) ABSTRACT

A guidance assistance apparatus includes: a memory that stores a set of instructions; and at least one processor configured to execute the set of instructions to: acquire a guidance route through which a guided person is to be guided from routes from a start-point position to an endpoint position; calculate, based on information relating to the routes, an influence level on the guided person in a case in which the guided person deviates from the acquired guidance route, with respect to each of branch places at which the guidance route branches into a route different from the guidance route; and output the calculated influence level.

18 Claims, 29 Drawing Sheets

(51) Int. Cl.
　　　*G08G 1/0968*　　(2006.01)
　　　*G01C 21/36*　　(2006.01)
　　　*H04W 4/90*　　(2018.01)
　　　*G01C 21/34*　　(2006.01)
　　　*H04W 4/02*　　(2018.01)

(52) U.S. Cl.
　　　CPC ....... *G08G 1/005* (2013.01); *G08G 1/096816* (2013.01); *G08G 1/096838* (2013.01); *G08G 1/096844* (2013.01); *G08G 1/096866* (2013.01); *H04W 4/90* (2018.02); *H04W 4/02* (2013.01)

(58) Field of Classification Search
　　　CPC ....... G08G 1/096838; G08G 1/096816; G08G 1/005; G01C 21/3641; G01C 21/3415
　　　See application file for complete search history.

(56) References Cited

U.S. PATENT DOCUMENTS

| | | |
|---|---|---|
| 9,360,335 B1 | 6/2016 | Powelson et al. |
| 2003/0028320 A1 | 2/2003 | Niitsuma |
| 2006/0224302 A1 | 10/2006 | Kwok et al. |
| 2007/0010941 A1 | 1/2007 | Marsh |
| 2010/0185387 A1 | 7/2010 | Sengoku et al. |
| 2010/0332121 A1 | 12/2010 | Okude et al. |
| 2011/0224893 A1 | 9/2011 | Scofield et al. |
| 2013/0103313 A1 | 4/2013 | Moore et al. |
| 2013/0282272 A1 | 10/2013 | Kluge et al. |
| 2014/0379258 A1 | 12/2014 | Beaurepaire et al. |
| 2015/0142300 A1 | 5/2015 | Tsirkin |
| 2015/0168174 A1 | 6/2015 | Abramson et al. |
| 2015/0253142 A1 | 9/2015 | Kornhauser et al. |
| 2017/0314945 A1* | 11/2017 | Konig ................ G01C 21/3461 |

OTHER PUBLICATIONS

Written Opinion of the International Searching Authority of PCT/JP2017/009203 dated Jun. 6, 2017.

Office Action for U.S. Appl. No. 16/085,231 dated Sep. 9, 2019.
Notice of Allowance dated Feb. 21, 2020 by the USPTO in U.S. Appl. No. 16/546,649.

* cited by examiner

| START-POINT NODE | END-POINT NODE |
|---|---|
| A | D |

| START-POINT NODE | END-POINT NODE | GUIDANCE ROUTE |
|---|---|---|
| A | D | A1→B1→C1 |
| A | E | A1→B1→C2→D2 |
| C | G | C1→D3→E2→F1 |
| ... | ... | ... |

Fig.8

| LINK | PRIOR NODE | POSTERIOR NODE | DISTANCE |
|---|---|---|---|
| A1 | A | B | 1 |
| B1 | B | C | 1 |
| B2 | B | C | 3 |
| B3 | B | C | 5 |
| C1 | C | D | 1 |
| C2 | C | D | 7 |

Fig.9

| NODE | BASIC ERROR RATE |
|---|---|
| A | 0 |
| B | 0.25 |
| C | 0.05 |
| D | 0 |

Fig.10

| LINK | TRAFFIC VOLUME | ROAD WIDTH | BRIGHTNESS | CLEANNESS |
|---|---|---|---|---|
| A1 | 5 | 5 | 1 | 1 |
| B1 | 8 | 4 | 3 | 2 |
| B2 | 4 | 2 | 2 | 4 |
| B3 | 1 | 1 | 1 | 1 |
| C1 | 4 | 4 | 1 | 2 |
| C2 | 4 | 2 | 1 | 2 |
| ... | ... | ... | ... | ... |

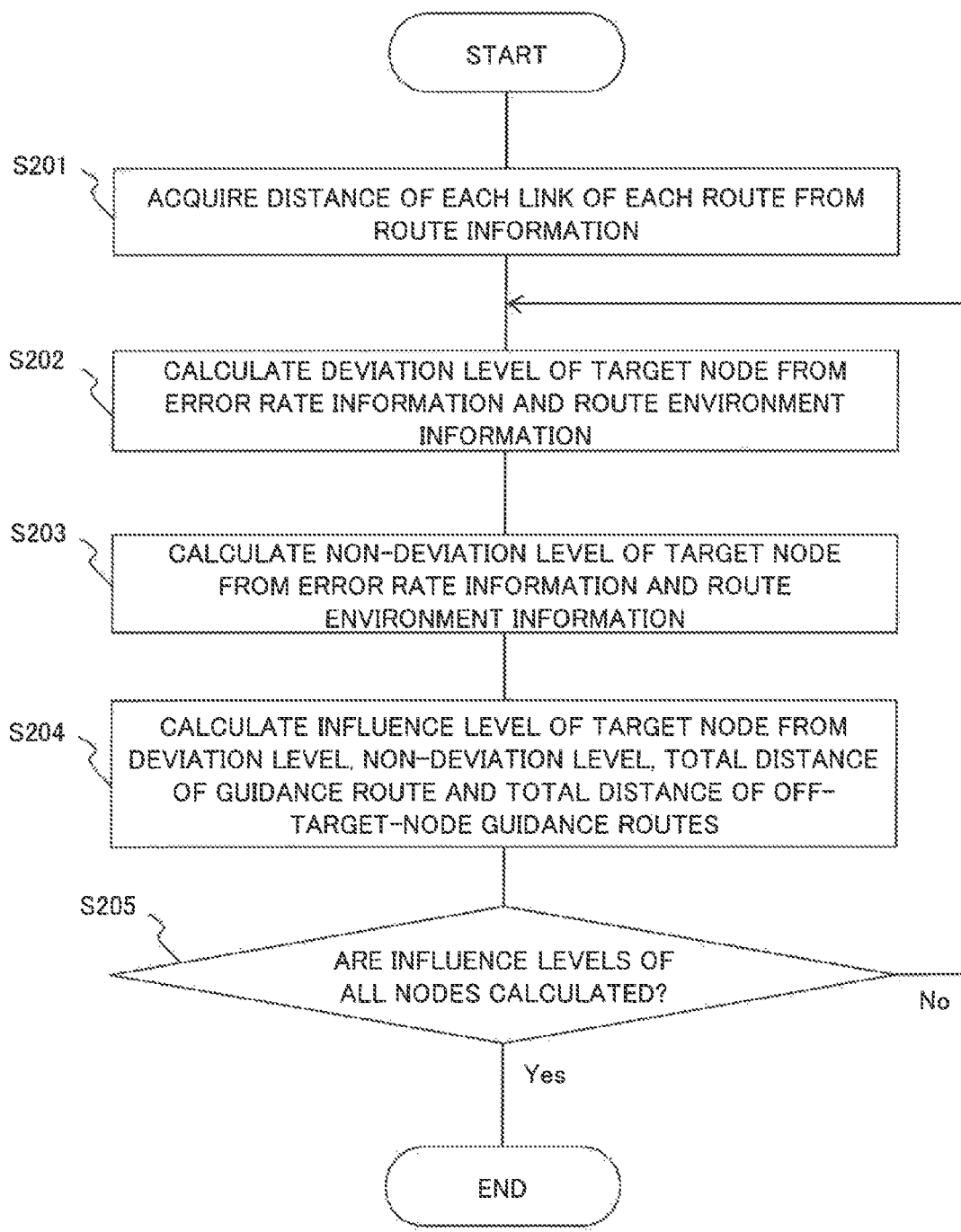

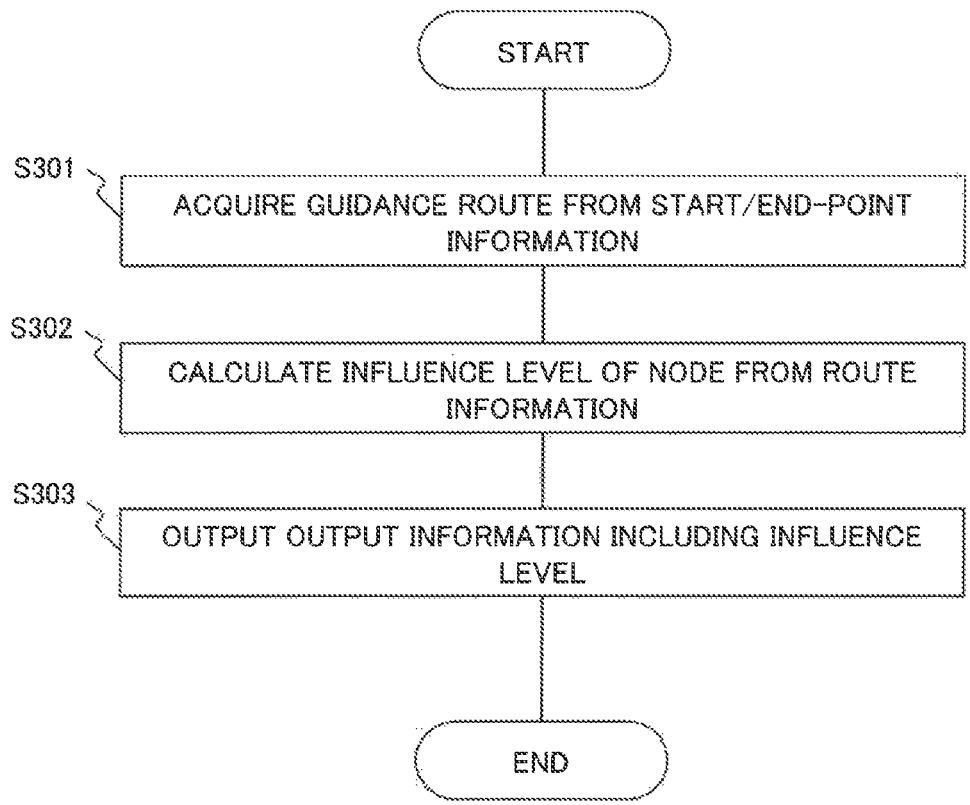

Fig.25

| START-POINT NODE | END-POINT NODE | GUIDANCE ROUTE | TARGET AREA |
|---|---|---|---|
| A | D | A1→B1→C1 | X AREA |
| A | E | A1→B1→C2→D2 | Y AREA |
| C | G | C1→D3→E2→F1 | Z AREA |
| ... | ... | ... | ... |

Fig.26

| DISPOSITION AREA | DISPOSITION NUMBER |
|---|---|
| X AREA | 1 |
| Y AREA | 5 |
| Z AREA | 2 |
| ... | ... |

Fig.27

| GUIDING PERSON'S NAME | CHARGE AREA |
|---|---|
| NIPPON TARO | X AREA |
| NIPPON JIRO | Y AREA |
| NIPPON SABURO | Y AREA |
| NIPPON SHIRO | Z AREA |
| ... | ... |

GUIDANCE ASSISTANCE APPARATUS, GUIDANCE ASSISTANCE METHOD, AND STORAGE MEDIUM FOR STORING PROGRAM

CROSS REFERENCE TO RELATED APPLICATIONS

This application is a continuation of U.S. application Ser. No. 16/085,231 filed on Sep. 14, 2018 which claims priority from National Stage of International Application No. PCT/JP2017/009203 filed Mar. 8, 2017, claiming priority based on Japanese Patent Application No. 2016-051772 filed Mar. 16, 2016, the entire disclosure of which is incorporated herein by reference.

TECHNICAL FIELD

The present invention relates to a guidance assistance apparatus, a guidance assistance method, and a storage medium for storing a program for assisting guiding a guided person to a destination place.

BACKGROUND ART

When people go to a specified destination place (e.g. an evacuation site or a venue of an event), there is a case in which it is desired to properly guide the people (hereinafter referred to as "guided person") to the destination place.

For purposes of guidance for a guided person to a destination place, PTL 1 discloses a technique relating to a system which guides, by intuitive understanding, a guided person to a destination place from a location in a given area, based on guidance information which is calculated by using a route calculation method known as Dijkstra's algorithm.

In addition, PTL 2 discloses a technique relating to a system which notifies a user of guidance information by using a mobile information terminal and quickly guides the user to a safe evacuation site, when emergency evacuation is necessary because of a disaster, such as the occurrence of a tsunami.

CITATION LIST

Patent Literature

[PTL 1] Japanese Unexamined Patent Application Publication No. 2006-47274
[PTL 2] Japanese Unexamined Patent Application Publication No. 2010-244407

SUMMARY OF INVENTION

Technical Problem

In some cases, for example, due to an external factor of some other person's behavior, a guided person deviates from a guidance route, without being based on guidance instruction information. If the guided person deviates from the guidance route, there may occur a case in which it is very difficult for the guided person to go to a destination place, for example, since the guided person is unable to go back to the guidance route or the distant for returning to the guidance route is long. It is thus preferable that the guidance for the guided person is conducted with consideration given to the influence on the guided person of the guided person's deviation from the guidance route.

In the techniques disclosed in PTL 1 and PTL 2, a route is calculated, and the calculated route is delivered as guidance information for example, a user's mobile information terminal. The route is a route of of a shortest distance or a route of a shortest time of movement from a departure place where the guided person exists, to a destination place such as an evacuation site. However, in the techniques disclosed in PTL 1 and PTL 2, the guided person is not guided with consideration given to the guided person's deviation from the guidance route.

The object of the present invention is to provide a guidance assistance apparatus, guidance assistance system, a guidance assistance method, and a program for performing guidance assistance taking the influence of a guided person's deviation from a guidance route on the guided person into consideration.

Solution to Problem

A guidance assistance apparatus according to an exemplary aspect of the present invention includes: guidance route acquisition means for acquiring a guidance route through which a guided person is to be guided from routes from a start-point position to an end-point position; influence level calculation means for calculating, based on information relating to the routes, an influence level on the guided person in a case in which the guided person deviates from the acquired guidance route, with respect to each of branch places at which the guidance route branches into a route different from the guidance route; and information output means for outputting the calculated influence level.

A guidance assistance method according to an exemplary aspect of the present invention includes: acquiring a guidance route through which a guided person is to be guided from routes from a start-point position to an end-point position; calculating, based on information relating to the routes, an influence level on the guided person in a case in which the guided person deviates from the acquired guidance route, with respect to each of branch places at which the guidance route branches into a route different from the acquired route; and outputting the calculated influence level.

A storage medium according to an exemplary aspect of the present invention stores a program which causes a computer to execute: a guidance route acquisition process of acquiring a guidance route through which a guided person is to be guided from routes from a start-point position to an end-point position; an influence level calculation process of calculating, based on information relating to the routes, an influence level on the guided person in a case in which the guided person deviates from the acquired guidance route, with respect to each of branch places at which the guidance route branches into a route different from the guidance route; and an information output process of outputting the calculated influence level.

An aspect of the present invention is achieved also by a program stored in the storage medium described above.

ADVANTAGEOUS EFFECTS OF INVENTION

The present invention enables guidance assistance taking the influence of a guided person's deviation from a guidance route on the guided person into consideration.

BRIEF DESCRIPTION OF DRAWINGS

FIG. 8 is a view illustrating an example of road information according to the first example embodiment of the present invention.

FIG. 9 is a view illustrating an example of error rate information according to the first example embodiment of the present invention.

FIG. 10 is a view illustrating an example of route environment information according to the first example embodiment of the present invention.

FIG. 11 is a flowchart illustrating an operation example of an influence level calculation unit according to the first example embodiment of the present invention.

FIG. 12 is a view illustrating an example of output information according to the first example embodiment of the present invention.

FIG. 13 is a flowchart illustrating an operation example of the guidance assistance apparatus according to the first example embodiment of the present invention.

FIG. 25 is a view illustrating an example of guidance route information according to the third example embodiment of the present invention.

FIG. 26 is a view illustrating an example of disposition information according to the third example embodiment of the present invention.

FIG. 27 is a view illustrating an example of guiding person information according to the third example embodiment of the present invention.

DESCRIPTION OF EMBODIMENTS

Figure 1:
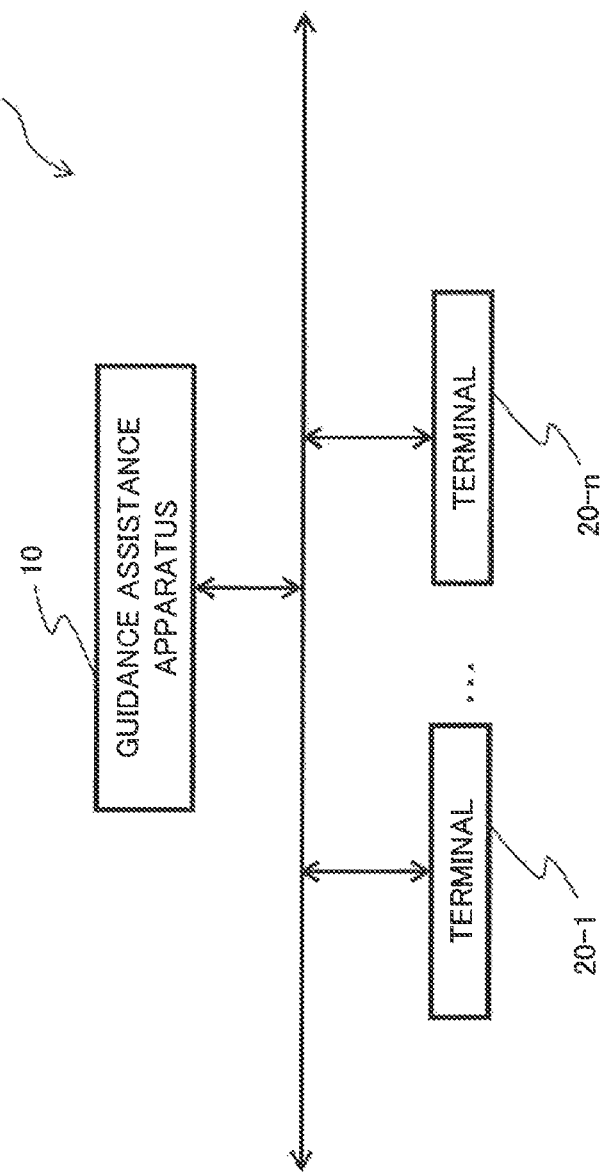
FIG. 1 is a view illustrating an operational configuration of a guidance assistance system according to a first example embodiment of the present invention.

Hereinafter, example embodiments of the present invention are described with reference to the drawings. However, the present invention is not limited to the example embodiments illustrated below. In the drawings described below, the same reference signs are assigned to components having the same function, and a repeated description may be omitted in some cases.

In the example embodiments to be illustrated below, a guidance assistance system is described as an example. The guidance assistance system calculates an influence level on a guided person in a case in which a guided person deviates from a guidance route, with respect to each branch place at which the guidance route branches into a route different from the guidance route, and presents output information including the influence level to any of the guided person, a guiding person and an administrator. The guidance route is a route through which a guided person is to be guided. The guiding person guides the guided person. The administrator manages the guiding person. The guidance assistance system is achieved by an information processing system.

First Example Embodiment

FIG. 1 is a view illustrating an operational configuration of a guidance assistance system 1 according to a first example embodiment of the present invention. As illustrated in FIG. 1, the guidance assistance system 1 according to the present example embodiment includes a guidance assistance apparatus 10 and terminals 20-1 to 20-n of which number is n. The guidance assistance apparatus 10 and the terminals 20-1 to 20-n are connected via a network such as the Internet or a local area network (LAN). The number n is an integer that is equal to or larger than one. In the description below, the terminals 20-1 to 20-n are also referred to as "terminal 20".

The guidance assistance apparatus 10 is an apparatus according to the present example embodiment, and outputs information for assisting guidance, which takes the influence level described above into consideration, for a guided person. The guidance assistance apparatus 10 is achieved by an information processing apparatus such as a personal computer (PC). Hereinafter, information that is output by the guidance assistance apparatus 10 and guidance assistance apparatuses 11, 12 and 13 according to other example embodiments is referred to as "output information". The details of the guidance assistance apparatuses 10, 11, 12 and 13 are described later.

The terminal 20 is an interface of a user, such as a guided person or a guiding person, who utilizes the guidance assistance system 1 according to the present example embodiment. The terminal 20 is achieved by a PC which has a general information processing function, and in which a software program for achieving a graphical user interface (GUI) is installed. The terminal 20 is, for example, an information processing apparatus, such as a tablet terminal or a wearable terminal, for performing display or the like of output information which is output from the guidance assistance apparatuses 10, 11, 12 and 13.

Figure 2:
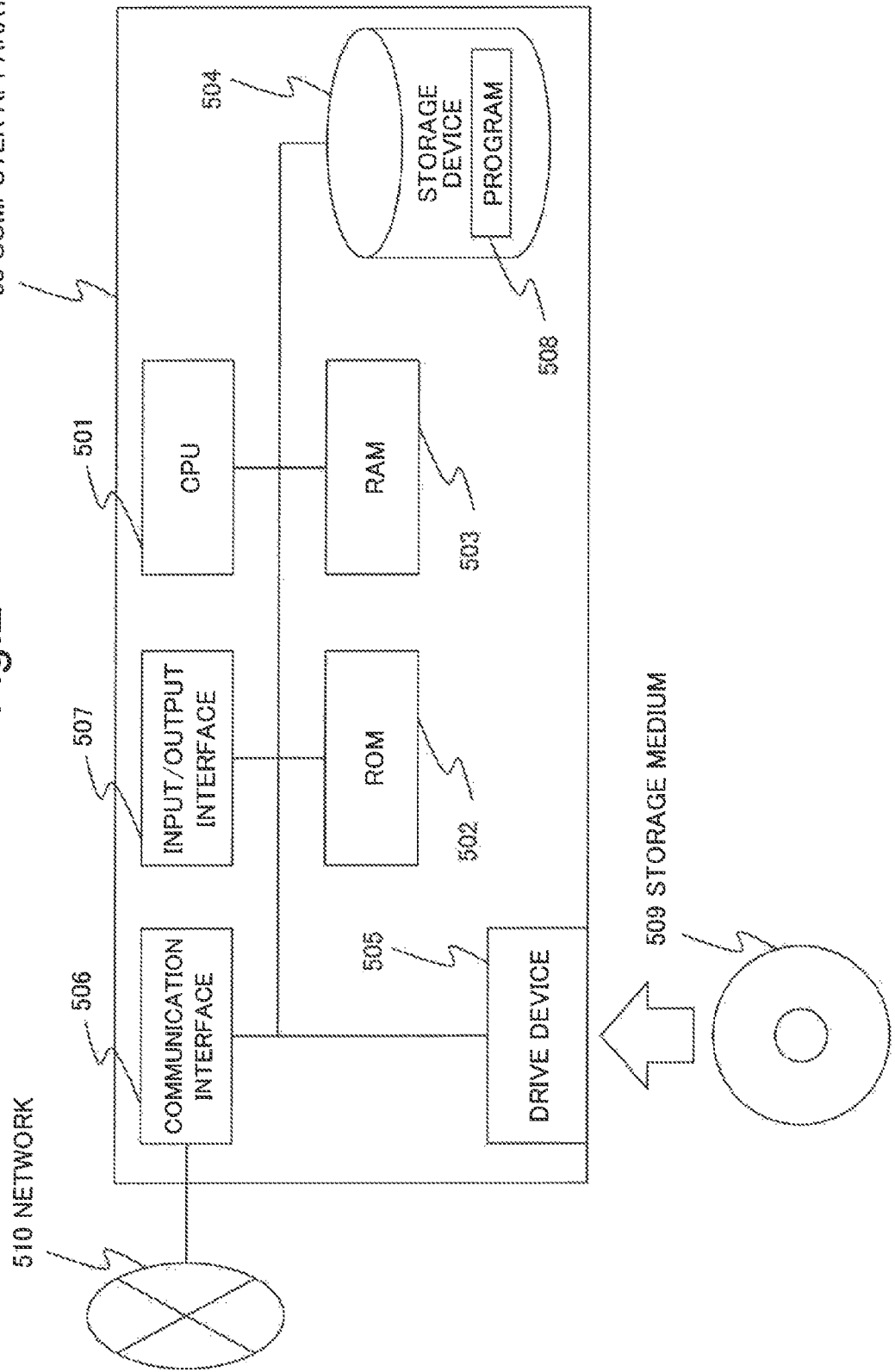
FIG. 2 is a block diagram illustrating a hardware configuration of a computer apparatus which achieves each apparatus of the guidance assistance system of the present invention.

The described next is hardware configurations of the guidance assistance apparatus 10 and the terminal 20 included in the guidance assistance system 1 according to the present example embodiment. FIG. 2 is a block diagram illustrating a hardware configuration of a computer apparatus 50 which achieves the guidance assistance apparatus 10 and the terminal 20 according to the present example embodiment. The guidance assistance apparatuses 11, 12 and 13 according to the other example embodiments of the present invention can also be achieved by the computer apparatus 50 illustrated in FIG. 2.

The computer apparatus 50 illustrated in FIG. 2 includes a central processing unit (CPU) 501, a read only memory (ROM) 502, a random access memory (RAM) 503, a storage device 504, a drive device 505, a communication interface 506, and an input/output interface 507.

The CPU 501 executes a program 508 by using the RAM 503. The program 508 may be stored in the ROM 502. Alternatively, the program 508 may be stored in a storage medium 509 and read out by the drive device 505, or may be transmitted from an external device via a network 510. The communication interface 506 exchanges data with the external device via the network 510. The input/output interface 507 exchanges data with peripheral devices (such as a keyboard, a mouse and a display device). The communication interface 506 and input/output interface 507 can function as a means of acquiring data. The communication interface 506 and input/output interface 507 can function as a means of outputting data. The data such as output information may be stored in the storage device 504 or may be included in the program 508.

The scope of each example embodiment includes a processing method of storing in a storage medium a program which causes the configuration of a concerning example embodiment to operate in a manner to achieve the functions of concerning the example embodiment to be described below, reading out, as a code, the program stored in the storage medium, and executing the code in the computer. The program, which causes the configurations of the example embodiments below to operate, is, to be more specific, a program which causes the computer to execute processes illustrated in FIG. 7, FIG. 11, FIG. 13, etc. Specifically, a computer-readable storage medium is also included in the scope of each example embodiment. In addition, needless to say, the storage medium in which the above-described program is stored, and the program itself is included in each example embodiment.

The storage medium may be, for instance, a floppy (trademark) disc, a hard disk, an optical disc, a magneto-optical disk, a CD-ROM, a magnetic tape, a nonvolatile memory card, or a ROM. Moreover, the scope of each example embodiment includes not only a program which operates alone by the program stored in the storage medium for executing processes, but also a program which runs on an OS and operates for executing processes in cooperation with other software, a function of an extended board, etc.

Figure 3:
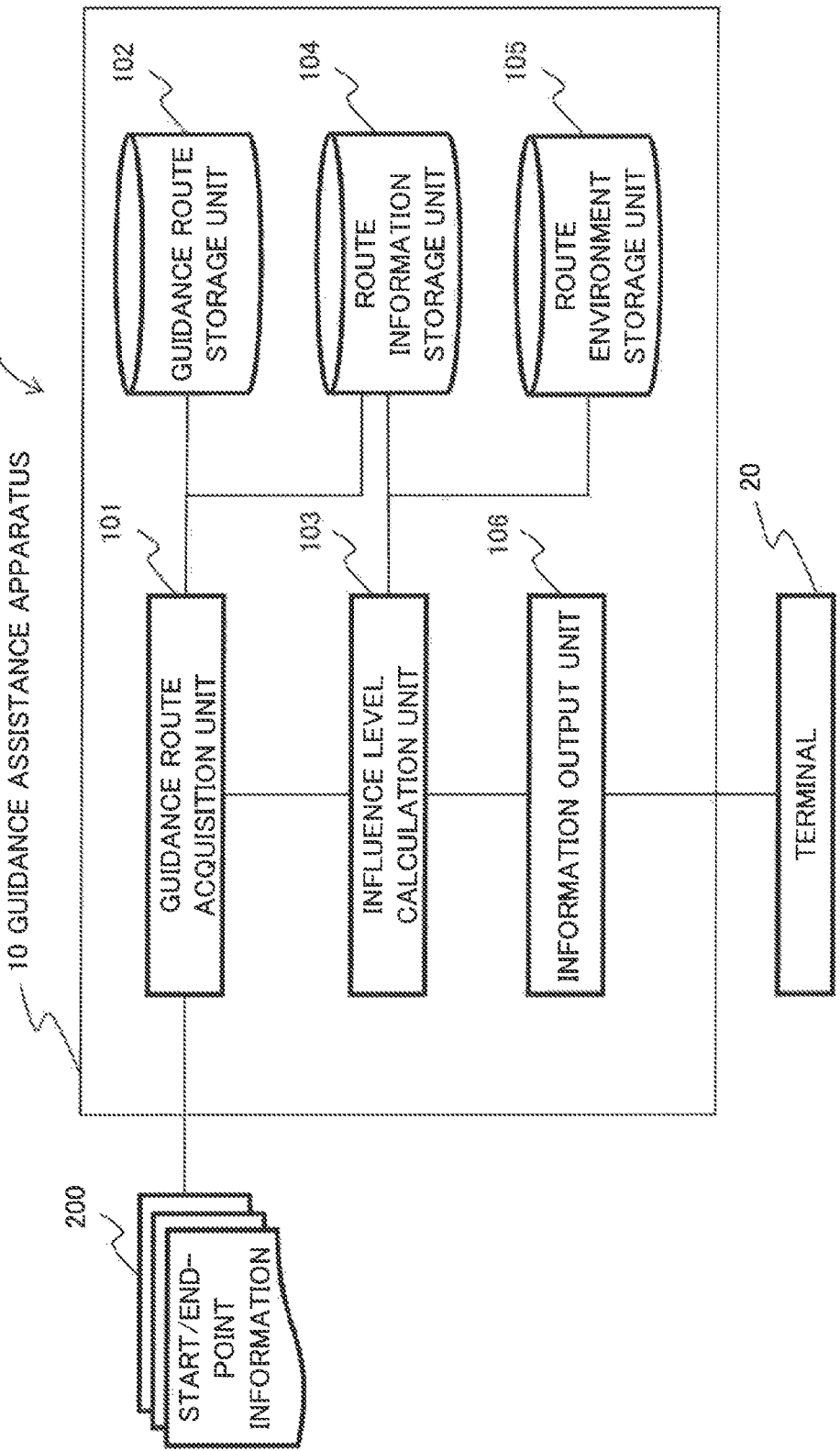
FIG. 3 is a block diagram illustrating a functional configuration of a guidance assistance apparatus according to the first example embodiment of the present invention.

The functions of the guidance assistance apparatus 10 included in the guidance assistance system 1 according to the present example embodiment is described next. FIG. 3 is a block diagram illustrating a functional configuration of the guidance assistance apparatus 10 according to the first example embodiment of the present invention. The blocks illustrated in FIG. 3 may be implemented in a single apparatus or may be separately implemented in a plurality of apparatuses. The transmission/reception of data between the blocks may be executed via any appropriate means such as a data bus, a network or a portable storage medium.

As illustrated in FIG. 3, the guidance assistance apparatus 10 according to the present example embodiment includes a guidance route acquisition unit 101, a guidance route storage unit 102, an influence level calculation unit 103, a route information storage unit 104, a route environment storage unit 105 and an information output unit 106.

The guidance route storage unit 102 is a storage medium which stores guidance route information. The guidance route information is indicative of a configuration of a predetermined route that is optimal for guidance (hereinafter referred to as "guidance route") in routes from a departure place to a destination place. The guidance route is, for example, a shortest route from the departure place to the destination place.

Figures 4, 5, 6:
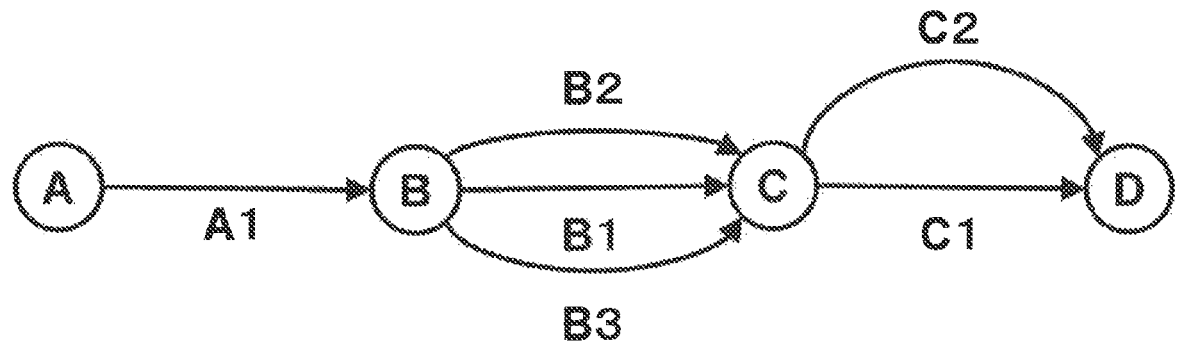
FIG. 4 is a view illustrating an example of routes according to the first example embodiment of the present invention.
FIG. 5 is a view illustrating an example of start/end-point information according to the first example embodiment of the present invention.
FIG. 6 is a view illustrating an example of guidance route information according to the first example embodiment of the present invention.

Here, routes are described first with reference to FIG. 4. FIG. 4 is a conceptual view illustrating routes according to the first example embodiment of the present invention. The routes are roads along which a guided person may possibly move from a departure place to a destination place. For example, as illustrated in FIG. 4, the routes include places from the departure place A to the destination place D, and roads A1, B1 and C1, etc. which connect the places. The places include branch places B and C of roads. Here, a place such as the departure place is referred to as "node", and a road connecting places is referred to as "link". For example, in the case of the routes illustrated in FIG. 4, a node A is a start-point node, and a node D is an end-point node, and a node B and a node C, which are other than the start point and end point, are relay nodes. Nodes may be connected by a plurality of links. For example, the node B and node C are connected by the link B1, link B2 and link B3.

The start-point node and end-point node are determined, for example, by start/end-point information 200. FIG. 5 is a view illustrating an example of the start/end-point information 200. As illustrated in FIG. 5, in the start/end-point information 200, for example, the start-point node is set to "A", and the end-point node is set to "D". The start/end-point information 200 is input, for example, from the terminal 20, which the guided person uses, to the guidance assistance apparatus 10.

Next, guidance route information is described with reference to FIG. 6. As illustrated in FIG. 6, for example, in the guidance route information, the start-point node and end-point node are associated with a guidance route. As illustrated in FIG. 6, the guidance route information indicates that, for example, the guidance route is "A1→B1→C1" in a case in which the start-point node is "A" and the end-point node is "D". FIG. 4 indicates that, when the guidance route is "A1→B1→C1", the guidance route is a route extending from the node A through the link A1, extending from the node B through the link B1, extending from the node C through the link C1, and then reaching the node D.

Although the guidance route is described above as the shortest route, the guidance route is, at a time of a disaster, for example, an evacuation route to an evacuation site of a guided person. The evacuation route is determined in consideration of a hazard map of a region. For example, when the guidance route have relation to a region near mountains, the guidance route is a route where the possibility of a landslide is expected to be low. For example, when the guidance route have relation to a region near the sea, the guidance route is a route at an altitude of higher than a certain level where flood damage by a tsunami is expected to be small.

The guidance route may be a shortest route which is mathematically calculated by a known algorithm other than the Dijkstra's algorithm, or may be a route where few obstacles exist and through which a physically handicapped evacuee can pass.

The route information storage unit 104 is a storage medium which stores route information. The route information includes road information which is information relating to roads (i.e. links) included in a route, and an error rate information which is information relating to a rate at which a guided person deviate from a guidance route to another link at a node included in the route.

FIG. 8 is a view illustrating an example of the road information stored in the route information storage unit 104 according to the first example embodiment of the present invention. As illustrated in FIG. 8, in the road information, a "link" is associated with a "distance" which is indicative of a distance of the link. The "link" indicates a road from a "prior node" on the side of the start-point node to a "posterior node" on the side of the destination place in a case in which a guided person goes to the destination place. As illustrated in FIG. 8, for example, in the case of a link A1, the distance from the prior node A to the posterior node B is 1. For example, a distance of 1 means that the distance is 1 kilometer.

FIG. 9 is a view illustrating an example of the error rate information according to the first example embodiment of the present invention. As illustrated in FIG. 9, in the error rate information, a node and a basic error rate is associated. The basic error rate represents a probability of deviation from guidance, which is dependent on the complexity in configuration of intersections. For example, when an intersection have a pedestrian bridge and an underground passage, thereby having a complex structure, the value of the basic error rate increases. As illustrated in FIG. 9, for example, the basic error rate of the node B is "0.25". The basic error rate of "0.25" means that a guided person deviates from the guidance route to another link at a probability of ¼.

The road information is, for example, data which is generated by automatically converting electronic map data, data which is acquired by reading information that is set by an administrator via a communication network, or data which is directly input from a keyboard by an administrator.

A value of a distance of a link, which is included in the road information, may be an actual distance, an approximate value acquired by rounding off the actual distance, or a ratio between links.

The start/end-point information 200 may be determined not in the terminal 20, but in the guidance assistance apparatus 10. The guidance assistance apparatus 10 may determine the start/end-point information 200 when the start/end-point information 200 is not input to the guidance assistance apparatus 10 from the terminal 20. For example, when a disaster or the like occurred, the guidance assistance apparatus 10 may change the start/end-point information 200. Specifically, the guidance assistance apparatus 10 may determine the start/end-point information 200 in the following manner, and may replace the start/end-point information input from the terminal 20 with the determined start/end-point information 200. The start/end-point information 200 may be, for example, data which is acquired by reading information that is set by an administrator via a communication network, data which is directly input from a keyboard by an administrator, or data which is generated by automatically converting electronic map data. For example, in the start/end-point information 200, at a time of a disaster, the present position of the terminal 20 of the user may be set as the start-point node, and a predetermined evacuation site in the area of the start-point node may be set as the end-point node.

The route environment storage unit 105 is a storage medium which stores route environment information. FIG. 10 is a view illustrating an example of the route environment information stored in the route environment storage unit 105 according to the first example embodiment of the present invention. In the route environment information illustrated in FIG. 10, a "link" of a route, a "traffic volume" indicative of the number of persons per unit time, who pass along the link, a "road width" indicative of the width of the link, "brightness" indicative of the brightness of the link, and "cleanness" indicative of the cleanness of the link are associated. Hereinafter, a person passing along the link is expressed as "passer-by". The traffic volume is, for example, a mean value of the number of passers-by (expressed in thousands) of the link (e.g. road) per hour. The number of passers-by is obtained by observation in the past. The road width is, for example, the value of the actual width (in meters) of the link. The brightness and cleanness are, for example, evaluation values (of five-grade evaluation) in the past, which are obtained from passers-by by questionnaire surveys or the like. As illustrated in FIG. 10, as regards the link A1, the "traffic volume" is "5", the "road width" is "5", the "brightness" is "1", and the "cleanness" is "1".

The guidance route acquisition unit 101 acquires the start/end-point information 200, and acquires a guidance route corresponding to the start/end-point information 200 from the guidance route information stored in the guidance route storage unit 102. The details of a guidance route acquisition process by the guidance route acquisition unit 101 are described later.

The influence level calculation unit 103 calculates an influence level indicative of a level of the influence on a guided person in a case in which the guided person deviates from the guidance route on the basis of the guidance route acquired by the guidance route acquisition unit 101, the route information stored in the route information storage unit 104, and the route environment information stored in the route environment storage unit 105. The details of an influence level calculation process by the influence level calculation unit 103 are described later.

The information output unit 106 outputs output information including the influence level calculated by the influence level calculation unit 103. An operation example of the information output unit 106 is described later.

The terminal 20 includes a display that which displays the output information which is output from the information output unit 106. A display mode of the terminal 20, which is based on the output information, is described later.

Figure 7:
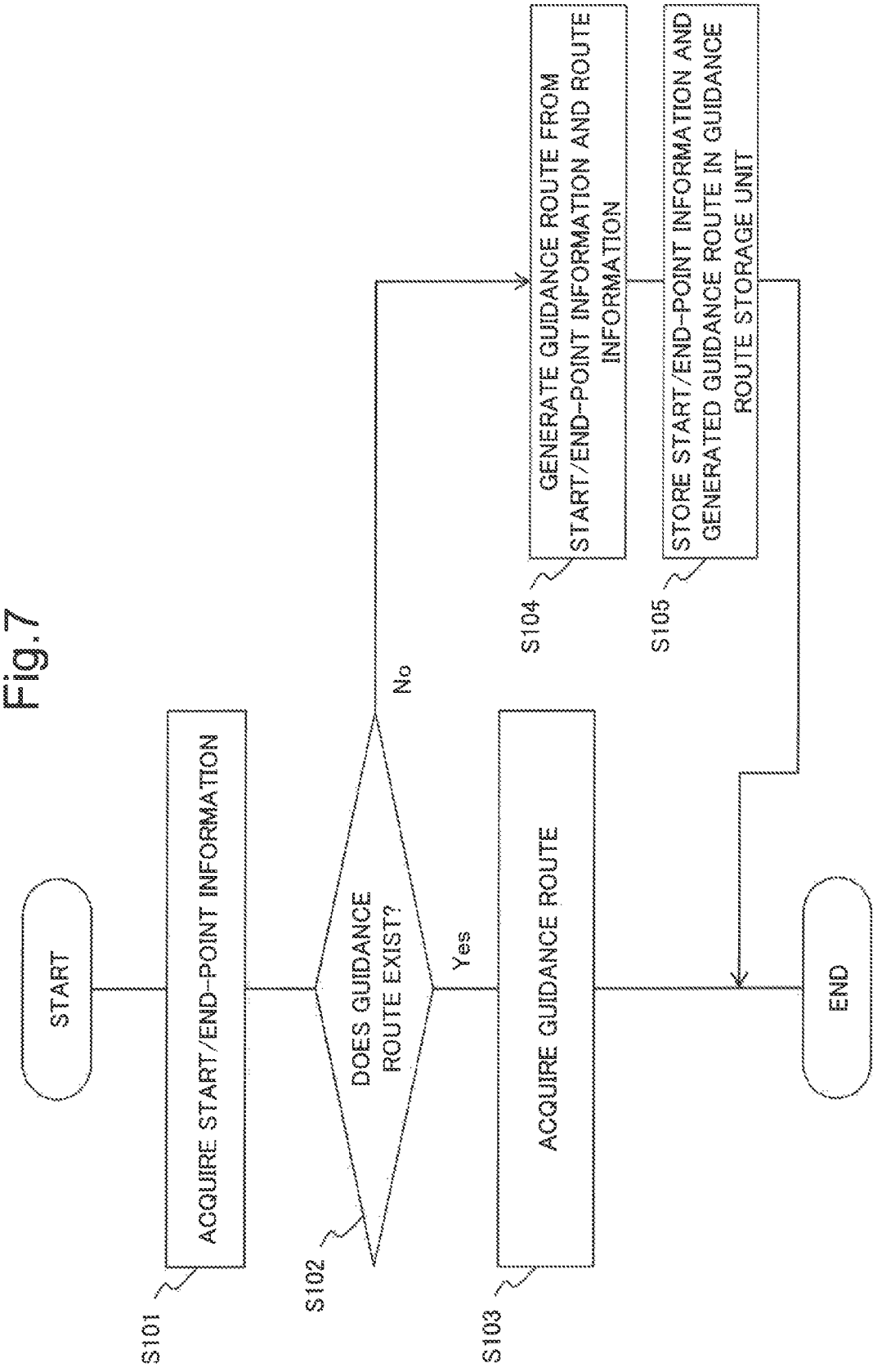
FIG. 7 is a flowchart illustrating an operation example of a guidance route acquisition unit according to the first example embodiment of the present invention.

Next, the details of the guidance route acquisition process by the guidance route acquisition unit 101 are described. FIG. 7 is a flowchart illustrating an operation example of the guidance route acquisition unit 101 according to the first example embodiment of the present invention. As illustrated in FIG. 7, the guidance route acquisition unit 101 acquires the start/end-point information 200 (step S101). For example, the guidance route acquisition unit 101 acquires the start-point node A and the end-point node D which are the start/end-point information 200 illustrated in FIG. 5. When a guidance route corresponding to the acquired start/end-point information 200 exists in the guidance route information stored in the guidance route storage unit 102 (Yes in step S102), the guidance route acquisition unit 101 acquires the corresponding guidance route and finishes the process (step S103). For example, when the guidance route information stored in the guidance route storage unit 102 is the guidance route information illustrated in FIG. 6, the guidance information corresponding to the acquired start-point node A and end-point node D exists. Thus, the guidance route acquisition unit 101 acquires the guidance route indicative of "A1→B1→C1" (hereinafter, referred to also as 'guidance route "A1→B1→C1"').

When a guidance route corresponding to the acquired start/end-point information 200 does not exist in the guidance route information stored in the guidance route storage unit 102 (No in step S102), the guidance route acquisition unit 101 generates a guidance route from the acquired start/end-point information 200 and the road information included in the route information stored in the route information storage unit 104 (step S104).

Specifically, the guidance route acquisition unit 101 generates a route of a shortest distance to the end-point node as the guidance route by using the acquired start/end-point information 200 and the road information, for example, based on Dijkstra's Algorithm. As illustrated in FIG. 4 and FIG. 8, the guidance route from the start-point node A to end-point node D is "A1→B1→C1" which is the shortest route. In the guidance route "A→B1→C1", the distance of the link A1 is 1, the distance of the link B1 is 1, and the distance of the link C1 is 1. The total (i.e. total distance) of the distances of the guidance route "A1→B1→C1" is 3, and the guidance route "A1→B1→C1" is the route of the shortest distance among the routes from the start-point node A to the end-point node D.

The guidance route acquisition unit 101 associates the start/end-point information 200 and the generated guidance route, stores the start/end-point information 200 and the generated guidance route in the guidance route storage unit 102, and finishes the process (step S105). In step S105, similarly to step S103, the guidance route acquisition unit 101 is supposed to have acquired the generated guidance route.

By a process like this, the guidance route acquisition unit 101 acquires a guidance route. Specifically, the guidance route acquisition unit 101 acquires, from routes from a start-point position to an end-point position, a guidance route that is a route through which a guided person is to be guided.

The guidance route acquisition unit 101 may acquire, as a guidance route, a route of a shortest arrival time up to the end-point node, for example, based on Dijkstra's Algorithm. When the route of the shortest arrival time is set as the guidance route, the guidance route acquisition unit 101 may generate the guidance route by using road information including information relating to time periods for links.

Next, the details of the influence level calculation process by the influence level calculation unit 103 are described. FIG. 11 is a flowchart illustrating an operation example of the influence level calculation unit 103 according to the first example embodiment of the present invention. As illustrated in FIG. 11, the influence level calculation unit 103 acquires a distance of each link of each route from the route information stored in the route information storage unit 104 (step S201). The influence level calculation unit 103 acquires information such as information that the distance of the link A1 is 1, as illustrated in FIG. 8. The influence level calculation unit 103 calculates a deviation level of a target node from the basic error rate information stored in the route information storage unit 104 and the route environment information stored in the route environment storage unit 105 (step S202). The target node is a node which is a target for the calculation of the influence level. In the details of the influence level calculation process of the present example embodiment, the target node is described as being the node B. The influence level calculation unit 103 calculates a deviation level indicative of a tendency for a guided person to deviate from the guidance route at the target node by using the basic error rate relating to the target node and the traffic volumes of the links relating to this node. A calculation equation of the deviation level is as follows.

$$\text{Deviation level} = \text{basic error rate of node} \times \text{traffic volumes of links other than guidance route} / \text{traffic volume of link of guidance route} \ldots \quad \text{(equation 1)}$$

Specifically, the deviation level becomes higher as the ratio of the traffic volumes of the links other than the guidance route to the traffic volume of the link of the guidance route becomes higher. As illustrated in FIG. 9, the basic error rate of the node B is 0.25. In addition, as illustrated in FIG. 10, the total of traffic volumes of the link B2 and link B3, which are the links other than the guidance route of the node B, is 5, and the traffic volume of the link B1, which is the link of the guidance route of the node B, is 8. Accordingly, if the above-described equation 1 is used, the deviation level of the node B is 0.25×5/8 and is 0.15625.

The influence level calculation unit 103 calculates a non-deviation level of the target node from the basic error rate information stored in the route information storage unit 104 and the route environment information stored in the route environment storage unit 105 (step S203). The influence level calculation unit 103 calculates a non-deviation level indicative of a tendency for a guided person not to deviate from the guidance route at the target node by using the basic error rate corresponding to the target node and the traffic volumes of the links corresponding to this node. A calculation equation of the non-deviation level is as follows.

Non-deviation level=(1−basic error rate)×traffic volume of link of guidance route/traffic volumes of links other than guidance route . . . (equation 2)

Specifically, the non-deviation level becomes higher as the ratio of the traffic volume of the link of the guidance route to the traffic volumes of the links other than the guidance route becomes higher. As illustrated in FIG. 9, the basic error rate of the node B is 0.25. In addition, as illustrated in FIG. 10, the total of traffic volumes of the link B2 and link B3, which are the links other than the guidance route of the node B, is 5, and the traffic volume of the link B1, which is the link of the guidance route of the node B, is 8. Accordingly, if the above-described equation 2 is used, the non-deviation level of the node B is (1−0.25)×8/5 and is 1.2.

The influence level calculation unit 103 calculates an influence level of the target node from the calculated deviation level and the non-deviation level, the total distance of the guidance route, and the distance of the entire routes other than the guidance route (hereinafter, referred to also as "total distance of off-target-node guidance routes") (step S204). A calculation equation of the influence level is as follows.

Influence level=distance of entire guidance route× non-deviation level+distance of entire routes other than guidance route×deviation level . . . (equation 3)

Hereinafter, a detailed process of step S204 is described. The influence level calculation unit 103 calculates the influence level in the guidance route on the basis of the calculated non-deviation level and deviation level and the total distance of the guidance route. As indicated by the above-described equation 3, the influence level calculation unit 103 calculates the influence level in the guidance route by multiplying the non-deviation level and the total distance of the guidance route. For example, the non-deviation level of the node B, which is calculated in step S203, is 1.2. For example, as illustrated in FIG. 8, the total distance of the guidance route "A1→B1→C1" is 1+1+1 and is 3. Specifically, the influence level in the guidance route at the node B is 1.2×3 and is 3.6.

The influence level calculation unit 103 calculates the influence level in the routes other than the guidance route on the basis of the calculated deviation level and the total distance of the off-target-node guidance routes. The off-target-node guidance route is a route in a case in which the guidance route is not taken at the target node and the guidance route is taken at nodes other than the target node. For example, as illustrated in FIG. 9, the off-target-node guidance routes of the node B are two routes, namely "A1→B2→C1" and "A1→B3→C1". The influence level calculation unit 103 calculates the influence level in routes other than the guidance route by multiplying the deviation level and the sum of the total distances of the off-target-node guidance routes, as indicated by the above-described equation 3. For example, the deviation level of the node B calculated in step S202 is 0.15625. As described above, the off-target-node guidance routes of the node B are "A1→B2→C1" and "A1→B3→C1". For example, as illustrated in FIG. 8, the total distance of each off-target-node guidance route is 1+3+1 and is 5 as regards "A1→B2→C1", and is 1+5+1 and is 7 as regards "A1→B3→C1". Specifically, the influence level in the routes other than the guidance route at the node B is 0.15625×(5+7) and is 1.875.

The influence level calculation unit 103 calculates the influence level of the target node on the basis of the influence level in the guidance route and the influence level in the routes other than the guidance route. The influence level calculation unit 103 calculates the influence level of the target node by adding the calculated influence level in the guidance route and the calculated influence level in the routes other than the guidance route, as indicated by the above-described equation 3. As described above, the calculated influence level in the guidance route at the target node B is 3.6. As described above, the calculated influence level in the routes other than the guidance route at the target node b is 1.875. Specifically, the influence level of the target node B is 3.6+1.875 and is 5.475.

When the influence level calculation unit 103 calculated the influence levels of all nodes (Yes in step S205), the influence level calculation unit 103 finishes the process. When the influence level calculation unit 103 has not yet completed calculation of the influence levels of all nodes (No in step S205), the influence level calculation unit 103 executes the process of step S202 to step S204 in order to calculate the influence levels of the other target nodes. For example, the influence level in the case in which the target node is the node C is 3×0.95+9×0.05, and is 3.3.

By a process like this, the influence level calculation unit 103 calculates a influence level of a target node. Specifically, the influence level calculation unit 103 calculates, based on information relating to routes, an influence level on a guided person in a case in which the guided person deviates from a guidance route for each target node that is a branch place at which the acquired guidance route branches into a route different from the acquired guidance route.

There is no limitation to the prior-posterior relationship between the process of step S202 and the process of step S203, and the process of step S202 and the process of step S203 may be executed in a reverse order or may be executed in parallel.

The present example embodiment is described on assumption that the influence level calculation unit 103 calculates the influence level for each node, but the present example embodiment is not limited thereto. For example, the influence level calculation unit 103 may calculate the influence level for each link. When the influence level calculation unit 103 calculates an influence level for each link, the route information storage unit 104 stores a basic error rate for each link, and the influence level calculation unit 103 calculates an influence level of a target node by multiplying, for each link, the basic error rate of a link relating to a target node, the distance of the link and the traffic volume of the link, and by adding calculated influence levels. Concretely, links relating to the target node B are the link B1 to link B3. For example, using the distance illustrated in FIG. 8 and the traffic volume illustrated in FIG. 10, the influence level of the link B1 in the case in which the basic error rate of the link B1 to link B3 is ⅓ is ⅓×1×8 and is 2.66667. Similarly, the influence level of the link B2 is 4, and the influence level of the link B3 is 1.66667. Consequently, the influence level in a case in which the target node is the node B is 8.33334.

Next, an operation example of the information output unit 106 is described. As illustrated in FIG. 3, the information output unit 106 outputs, for example, output information to the terminal 20. FIG. 12 is a view illustrating an example of the output information including influence level information according to the first example embodiment of the present invention. In the influence level information, the influence level of a target node is associated with the target node. In FIG. 12, the output information including the influence level information indicates that the influence level of the node B that is the target node is "5.475". In other words, the information output unit 106 outputs the calculated influence level.

The information output unit 106 may output the output information including all of the target nodes and influence levels of the target nodes, which are calculated, or may output the output information including a part of the target nodes and influence levels of the part of the target nodes, which are calculated. For example, when the influence level of the node A that is the target node is 0, the information output unit 106 outputs the output information which does not include the influence level of the node A.

Figure 14:
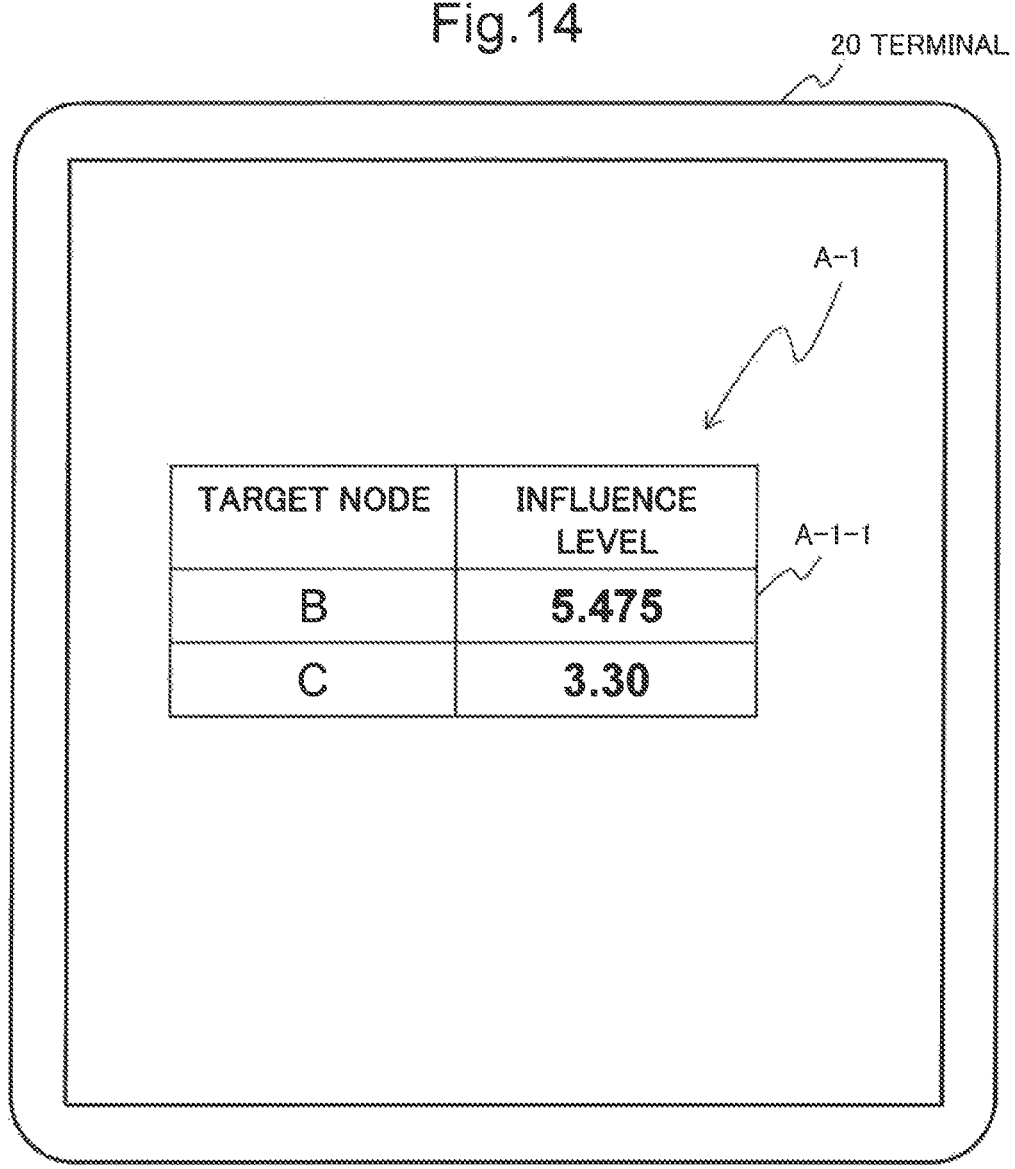
FIG. 14 is a view illustrating an example of a display screen which is displayed on a terminal, based on the output information, according to the first example embodiment of the present invention.

Next, referring to FIG. 14, a display mode of the terminal 20, which is based on the output information, is described. FIG. 14 is a view illustrating an example of a display screen which is displayed on the terminal 20, based on the output information, according to the first example embodiment of the present invention. In the case of this example, the information output unit 106 outputs the output information including the influence level information to the terminal 20. A display screen A-1 of the terminal 20 illustrated in FIG. 14 displays influence level information A-1-1. As illustrated in FIG. 14, the influence level information A-1-1 includes target nodes and the influence levels of the target nodes.

Next, the operation of the guidance assistance apparatus 10 according to the present example embodiment is described. FIG. 13 is a flowchart illustrating an operation example of the guidance assistance apparatus 10 according to the first example embodiment of the present invention. The guidance route acquisition unit 101 acquires the guidance route from the start/end-point information 200 which is input (step S301). The influence level calculation unit 103 calculates the influence level of a node from the guidance route acquired by the guidance route acquisition unit 101 and the route information (step S302). The information output unit 106 outputs the output information including the influence level of the node, which is calculated by the influence level calculation unit 103 (step S303).

As described above, the guidance assistance system 1 according to the present example embodiment acquires the guidance information from the start/end-point information 200 and the guidance route information, calculates the influence level for each target node on the basis of the acquired guidance route, route information and route environment information, outputs the output information including the calculated influence level to the terminal 20, and causes the terminal 20 to display the output information.

This enables the guided person to confirm, by the terminal 20, the output information including the influence level information, and thus achieves performing guidance assistance taking the influence of a guided person's deviation from a guidance route on the guided person into consideration.

Figure 15:
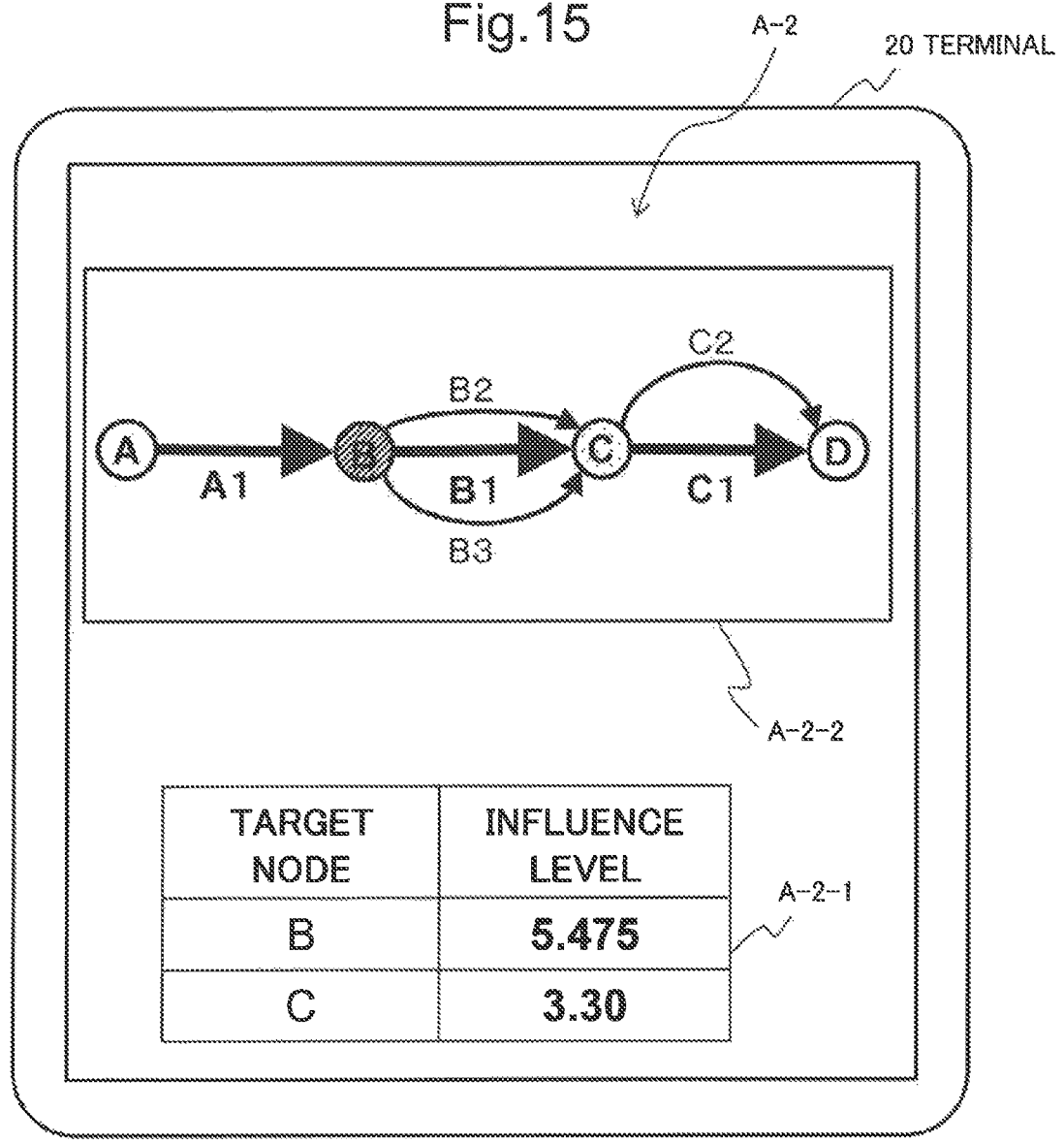
FIG. 15 is a view illustrating another example of the display screen which is displayed on the terminal, based on the output information, according to the first example embodiment of the present invention.

In the first example embodiment, the display mode of the terminal 20 illustrated in FIG. 14 is described as a concrete example. However, this is merely an example, and the display mode of the terminal 20 may be another display mode. Hereinafter, other display modes of the terminal 20, which are based on the output information, are described by using FIG. 15 and FIG. 16. FIG. 15 is a view illustrating another example of the display screen which is displayed on the terminal 20, based on the output information, according to the first example embodiment of the present invention. In the case of this example, the information output unit 106 outputs to the terminal 20 the output information including the influence level information and influence level route information. The influence level route information is generated by the information output unit 106 on the basis of the guidance route information stored in the guidance route storage unit 102, the route information stored in the route information storage unit 104, and the influence level calculated by the influence level calculation unit 103. Specifically, the information output unit 106 outputs the guidance route and the information relating to the routes.

A display screen A-2 of the terminal 20, illustrated in FIG. 15, displays influence level information A-2-1 and influence level route information A-2-2. In the influence level route information A-2-2, arrows indicating the guidance route are emphasized in arrows representing the routes. In the influence level route information A-2-2, the arrows indicating the guidance route are, for example, emphasized in bold as illustrated in FIG. 15. Moreover, in the influence level route information A-2-2, each node included in the routes is emphasized based on the value of the influence level. In the influence level route information A-2-2, for example, the node B that is a node having a greatest value of the influence level (hereinafter, referred to also as "risk node") is emphasized by hatching as illustrated in FIG. 15.

In the guidance assistance system 1 according to the present example embodiment, the information output unit 106 outputs the output information including the influence level information and the influence level route information. This enables the guided person to confirm, by the terminal 20, the risk node which is the node emphasized on the routes, the guided person can be prevented from deviating from the guidance route at the risk node when the guidance assistance is conducted.

Figure 16:
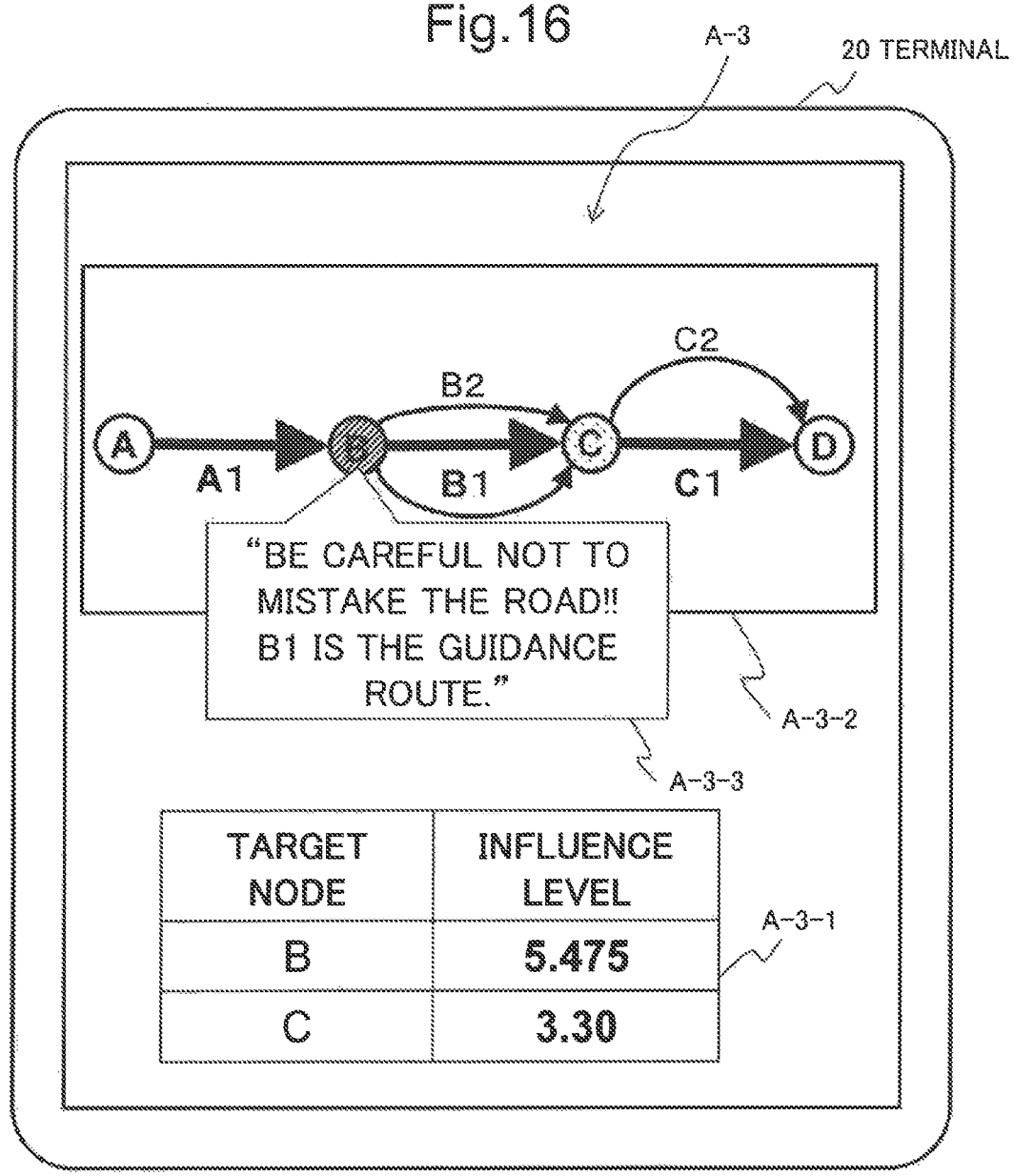
FIG. 16 is a view illustrating another example of the display screen which is displayed on the terminal, based on the output information, according to the first example embodiment of the present invention.

Next, another display mode of the terminal 20, which is based on the output information, is described by using FIG. 16. FIG. 16 is a view illustrating another example of the display screen which is displayed on the terminal 20, based on the output information, according to the first example embodiment of the present invention. In the case of the present example, the information output unit 106 outputs to the terminal 20 the output information including the influence level information, the influence level route information, and guidance information. The guidance information is information for guiding a guided person to a guidance route. The guidance information is, for example, character string information including an alert to the guided person and the guidance route at the risk node. The information output unit 106 outputs guidance assistance information by using the influence level information, the guidance route and the influence level route information. In other words, the information output unit 106 outputs guidance information which is information for guiding a guided person to a guidance route on the basis of the influence level, guidance route and the information relating to the routes.

A display screen A-3 of the terminal 20 illustrated in FIG. 16 displays influence level information A-3-1, influence level route information A-3-2, and guidance information A-3-3. For example, the guidance information A-3-3, which is displayed in the display screen A-3 illustrated in FIG. 16, is character string information such as "Be careful not to mistake the road!! B1 is the guidance route." The guidance information A-3-3 indicates that the risk node is the node B, and the guidance route of this node is the link B1.

In the guidance assistance system 1 according to the present example embodiment, the information output unit 106 outputs the output information including the influence level information, the influence level route information and the guidance information. This enable the guided person to confirm, by the terminal 20, the alert for preventing a guided person from deviating from a guidance route at a risk node, the guided person can be prevented from deviating from the guidance route at the risk node when the guidance assistance is conducted.

In addition, as illustrated in FIG. 16, the guidance information is described in a balloon drawn from the risk node of the influence level route information. In the guidance information A-3-3 illustrated in FIG. 16, the balloon including the character string information, including the alert to the guided person and the guidance route at the risk node, is displayed on the display screen A-3 of the terminal 20 at the position of the node B, which is the risk node in the influence level route information A-3-2 which the display screen A-3 displays. The guidance information indicates that the node related to the balloon is the risk node. In addition to the existence of the advantageous effects obtained by the display mode illustrated in FIG. 14, that enables the guided person to easily confirm the risk node and the guidance route at the risk node. Accordingly, the guided person can be prevented from deviating from the guidance route when the guidance assistance is conducted.

Upon detecting the terminal 20 existing in a predetermined range (e.g. within a range of a radius of 5 meters) from the position of the risk node, the information output unit 106 may output, in addition to the guidance information, output information including alert information, such as sound or vibration, to the detected terminal 20. For example, the terminal 20 that is the target of the output is the terminal 20 of the guided person who wishes notification of the alert information. In this case, the guidance assistance apparatus 10 acquires, at appropriate timing, position information of the terminal 20 from a position information acquisition service of a global positioning system (GPS) or the like, or from position information added to transmission information which the terminal 20 transmits via a social networking service (SNS). This the guided person to confirm, by the terminal 20, the output information including the guidance information and alert information at a timing when the guided person is located near the risk node, the guided person can be prevented from deviating from the guidance route at the risk node when the guidance assistance is conducted.

In the present example embodiment, the output information is described as the information which is output to the terminal 20 and is displayed. Alternatively, the output information may be information which is output to an external device or the like. Concretely, the output information is paper which is output by a printer or the like. This enables the guided person to confirm the output information including the influence level information even when the terminal 20 is not in a usable state due to battery power outage, disconnection from the network, etc. Therefore, that achieves performing guidance assistance taking the influence of a guided person's deviation from a guidance route on the guided person into consideration.

In the influence level route information, for example, a distance of a route may be associated with a length of an arrow. In the influence level route information A-2-2 illustrated in FIG. 15, the length of the arrows of the guidance route "A1→B1→C1" is displayed so that the length thereof is shorter in comparison with other routes such as B2.

Second Example Embodiment

Figure 17:
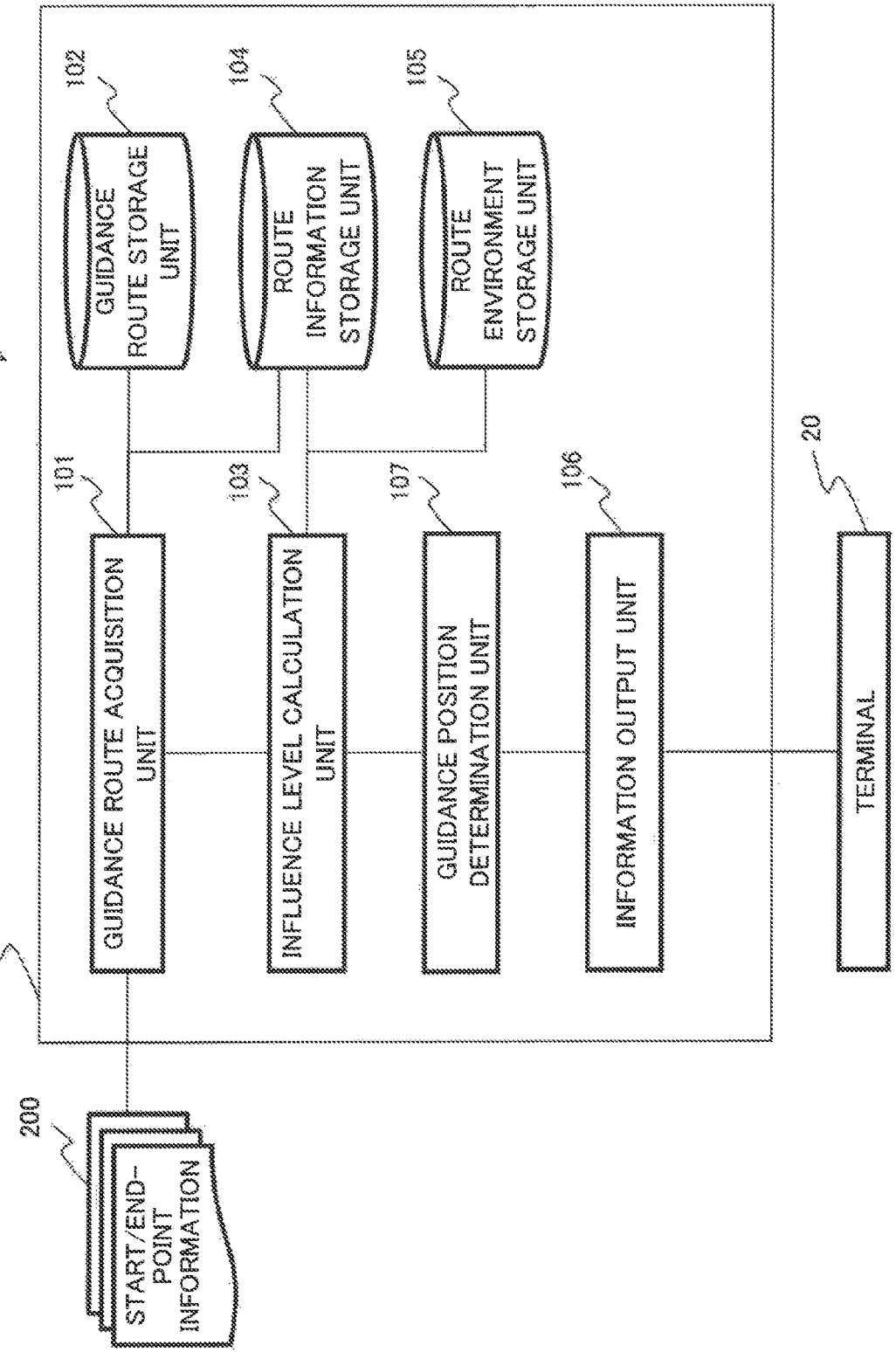
FIG. 17 is a block diagram illustrating a functional configuration of a guidance assistance apparatus according to a second example embodiment of the present invention.

Next, a second example embodiment is described. In the first example embodiment, the guidance information to the guided person is output. In the present example embodiment, guidance assistance information to a guiding person is output. The function of a guidance assistance apparatus 11 included in a guidance assistance system 1 according to the present example embodiment is described as follows. FIG. 17 is a block diagram illustrating a functional configuration of the guidance assistance apparatus 11 according to the second example embodiment of the present invention. As illustrated in FIG. 17, the guidance assistance apparatus 11 according to the present example embodiment includes a guidance position determination unit 107 in addition compared with the configuration of the guidance assistance apparatus 10 of the first example embodiment. The configuration of the guidance assistance system 1 according to the present example embodiment is a configuration in which the guidance assistance apparatus 10 included in the guidance assistance system according to the first example embodiment and illustrated in FIG. 1 is replaced with the guidance assistance apparatus 11.

The guidance position determination unit 107 determines a guidance position which is a position at which a guiding person should guide a guided person on the basis of the influence level for each target node, which is calculated by the influence level calculation unit 103. Concretely, for example, when an influence level of a target node exceeds a threshold "4" which is a predetermined condition, the guidance position determination unit 107 determines the position of the target node as the guidance position. For example, as illustrated in FIG. 12, when the influence level for each node is indicative of 5.475 at the node B and 3.30 at the node C, and the predetermined condition is indicative of the threshold "4", the guidance position determination unit 107 determines the position of the node B of exceeding the threshold as the guidance position. In other words, based on an influence level for each branch place and a condition relating to a disposition of a guiding person who guides a guided person, the guidance position determination unit 107 determines, from branch places, a guidance position at which the guiding person is to guide the guided person.

The information output unit 106 outputs output information including influence level information and guidance position information. As illustrated in FIG. 17, the information output unit 106 outputs, for example, the output information to the terminal 20. In the guidance position information, a guidance position determined by the guidance position determination unit 107 and a target node that is the guidance position are associated. For example, the guidance position information indicates that the guidance position is "node B". In other words, the information output unit 106 outputs the guidance position.

The terminal 20 displays the output information which is output by the information output unit 106. A display mode of the terminal 20, which is based on the output information, is described later.

Figure 18:
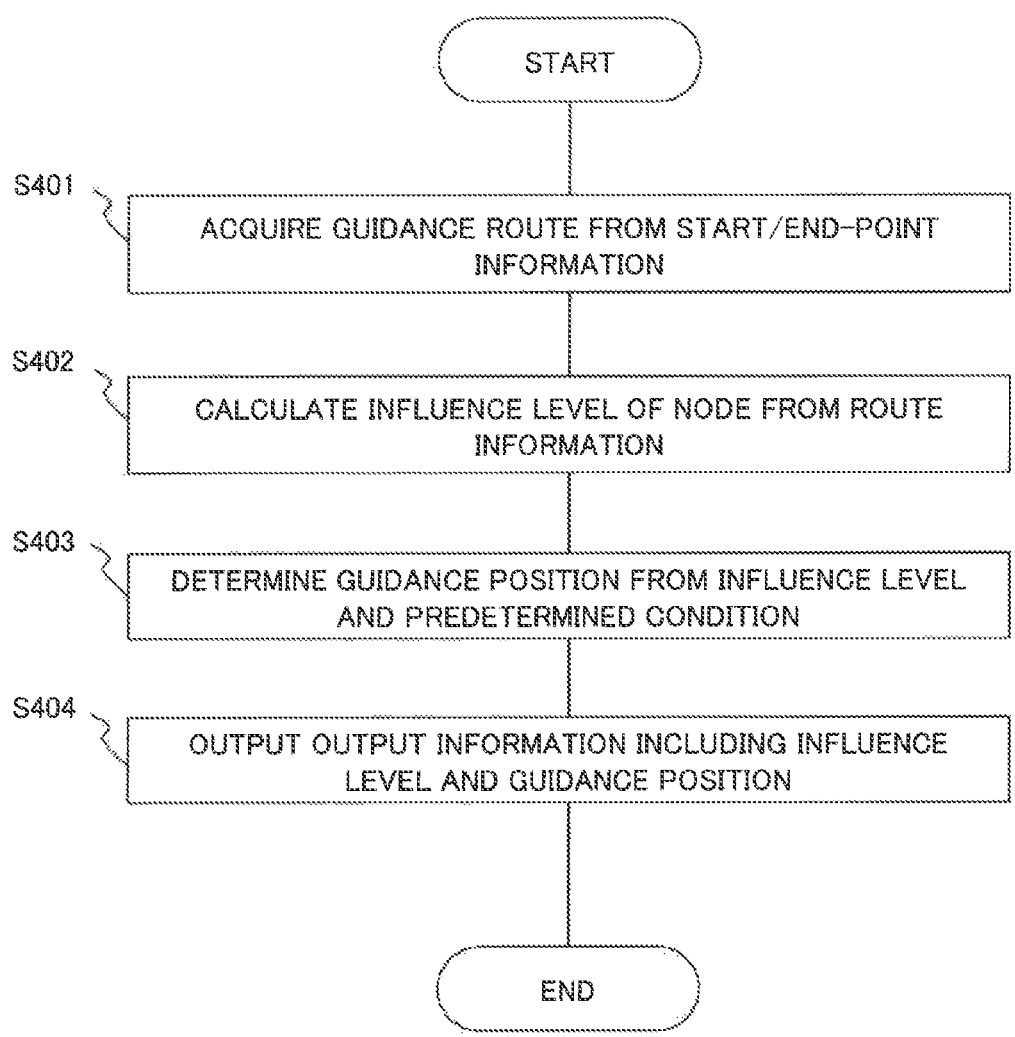
FIG. 18 is a flowchart illustrating an operation example of the guidance assistance apparatus according to the second example embodiment of the present invention.

Next, an operation of the guidance assistance apparatus 11 according to the present example embodiment is described. FIG. 18 is a flowchart illustrating an operation example of the guidance assistance apparatus 11 according to the second example embodiment of the present invention. The guidance route acquisition unit 101 acquires a guidance route from the start/end-point information 200 which is input (step S401). The influence level calculation unit 103 calculates influence levels of nodes on the basis of the guidance route acquired by the guidance route acquisition unit 101 and the route information (step S402). The guidance position determination unit 107 determines a guidance position on the basis of the influence levels and the predetermined condition (step S403). The information output unit 106 outputs the output information including the influence levels of the nodes calculated by the influence level calculation unit 103 and the guidance position determined by the guidance position determination unit 107 (step S404).

By this process, the guidance assistance apparatus 11 acquires the guidance route, calculates the influence level of the node, determines the guidance position, and outputs the output information.

Figure 19:
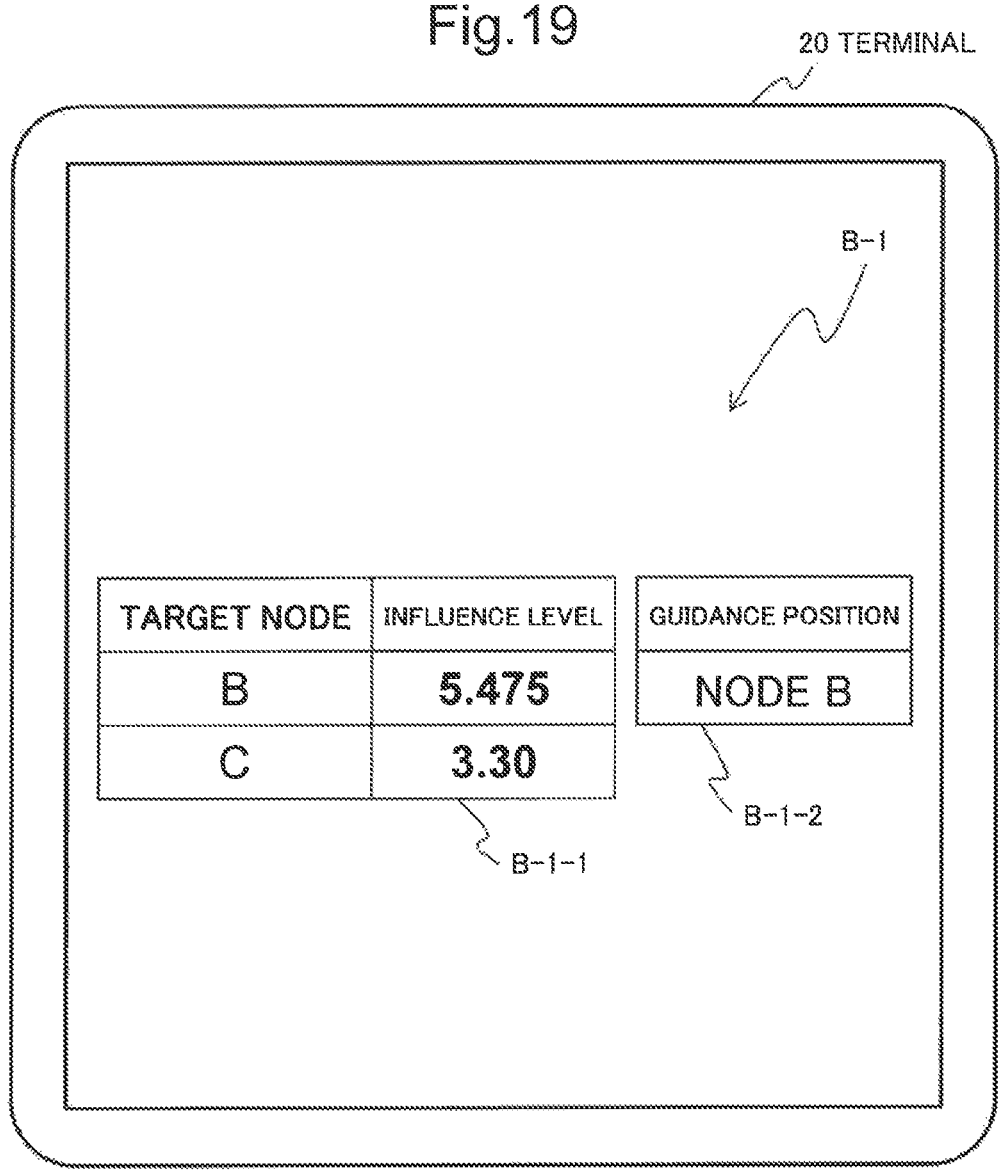
FIG. 19 is a view illustrating an example of a display screen which is displayed on the terminal, based on the output information, according to the second example embodiment of the present invention.

Next, referring to FIG. 19, a display mode of the terminal 20, which is based on the output information, is described. FIG. 19 is a view illustrating an example of a display screen which is displayed on the terminal 20, based on the output information, according to the second example embodiment of the present invention. In the case of the present example, the information output unit 106 outputs to the terminal 20 the output information including the influence level information and the guidance position information. A display screen B-1 of the terminal 20 illustrated in FIG. 19 displays influence level information B-1-1 and guidance position information B-1-2. Since the influence level information B-1-1 of the present example embodiment has the same configuration as that of the influence level information A-1-1 of the first example embodiment, a description thereof is omitted. As illustrated in FIG. 19, the guidance position information B-1-2 includes a guidance position and the target node corresponding to the guidance position. For example, in the output information which the display screen B-1 displays, the "guidance position" is "node B".

As described above, in the guidance assistance system 1 according to the present example embodiment, the guidance position is determined based on the influence level for each target node, which is calculated based on the guidance route, and the route information and route environment information, and the output information including the calculated influence level and the determined guidance position is output to the terminal 20 and is displayed.

That enables the guided person to confirm, by the terminal 20, the output information including the influence level information and guidance position information, and thus achieves performing guidance assistance taking the influence of a guided person's deviation from a guidance route on the guided person into consideration. Moreover, that enables the guiding person to confirm, by the terminal 20, the output information including the influence level information and guidance position information, the guiding person is capable of guiding the guided person at a proper position when the guidance assistance is conducted.

Figure 20:
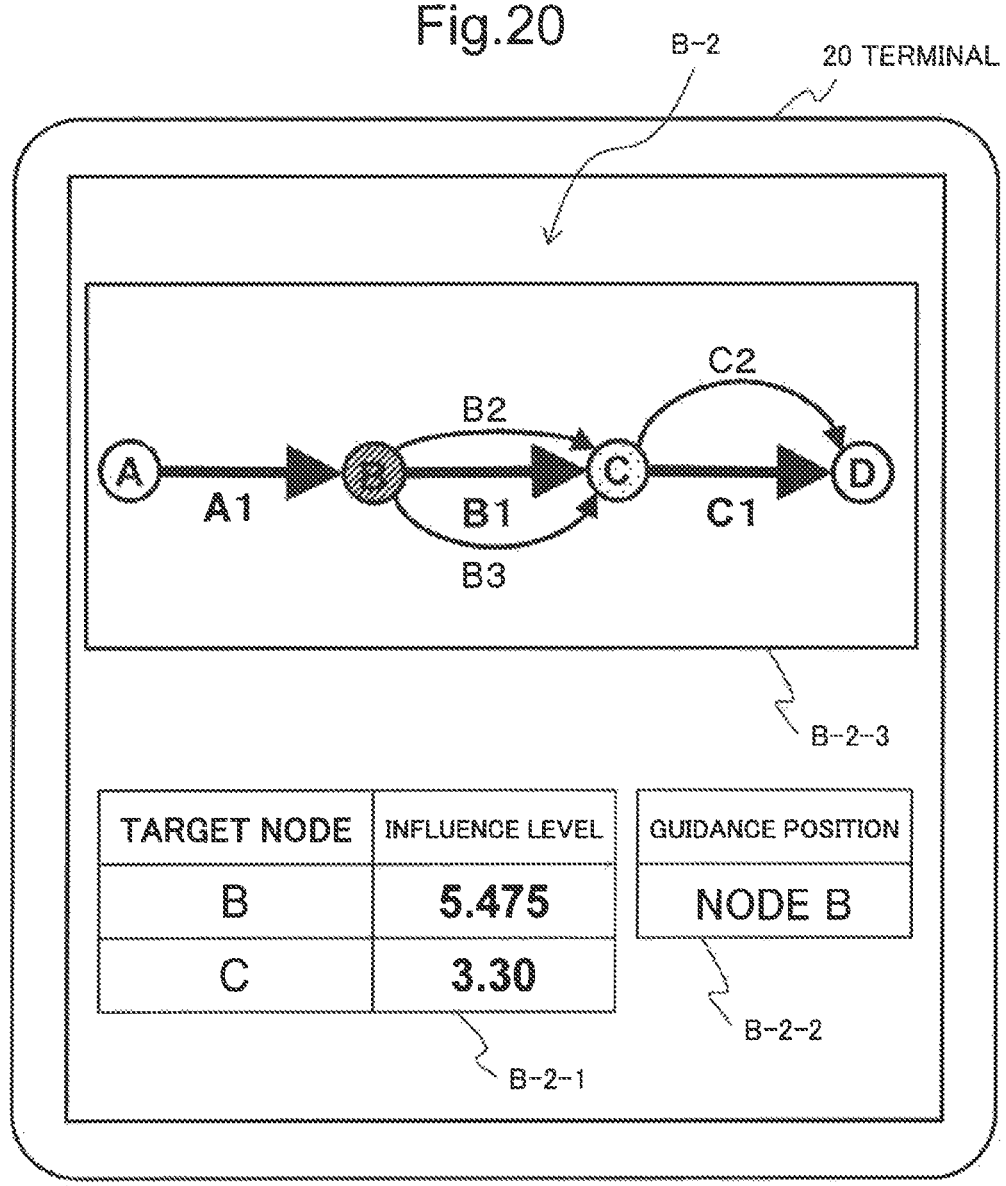
FIG. 20 is a view illustrating another example of the display screen which is displayed on the terminal, based on the output information, according to the second example embodiment of the present invention.

In the second example embodiment, the display mode of the terminal 20 illustrated in FIG. 19 is described as a concrete example. However, this is merely an example, and the display mode of the terminal 20 may be some other display mode. Hereinafter, other display modes of the terminal 20, which are based on the output information, are described by using FIG. 20 and FIG. 22. FIG. 20 is a view illustrating another example of the display screen which is displayed on the terminal 20 on the basis of the output information concerning the second example embodiment of the present invention. In the case of this example, the information output unit 106 outputs to the terminal 20 output information including the influence level information, the guidance position information and the influence level route information. A display screen B-2 of the terminal 20 illustrated in FIG. 20 displays influence level information B-2-1, guidance position information B-2-2 and influence level route information B-2-3. Since the influence level route information B-2-3 of the present example embodiment has the same configuration as that of the influence level route information A-2-2 of the first example embodiment, a description thereof is omitted.

Figure 21:
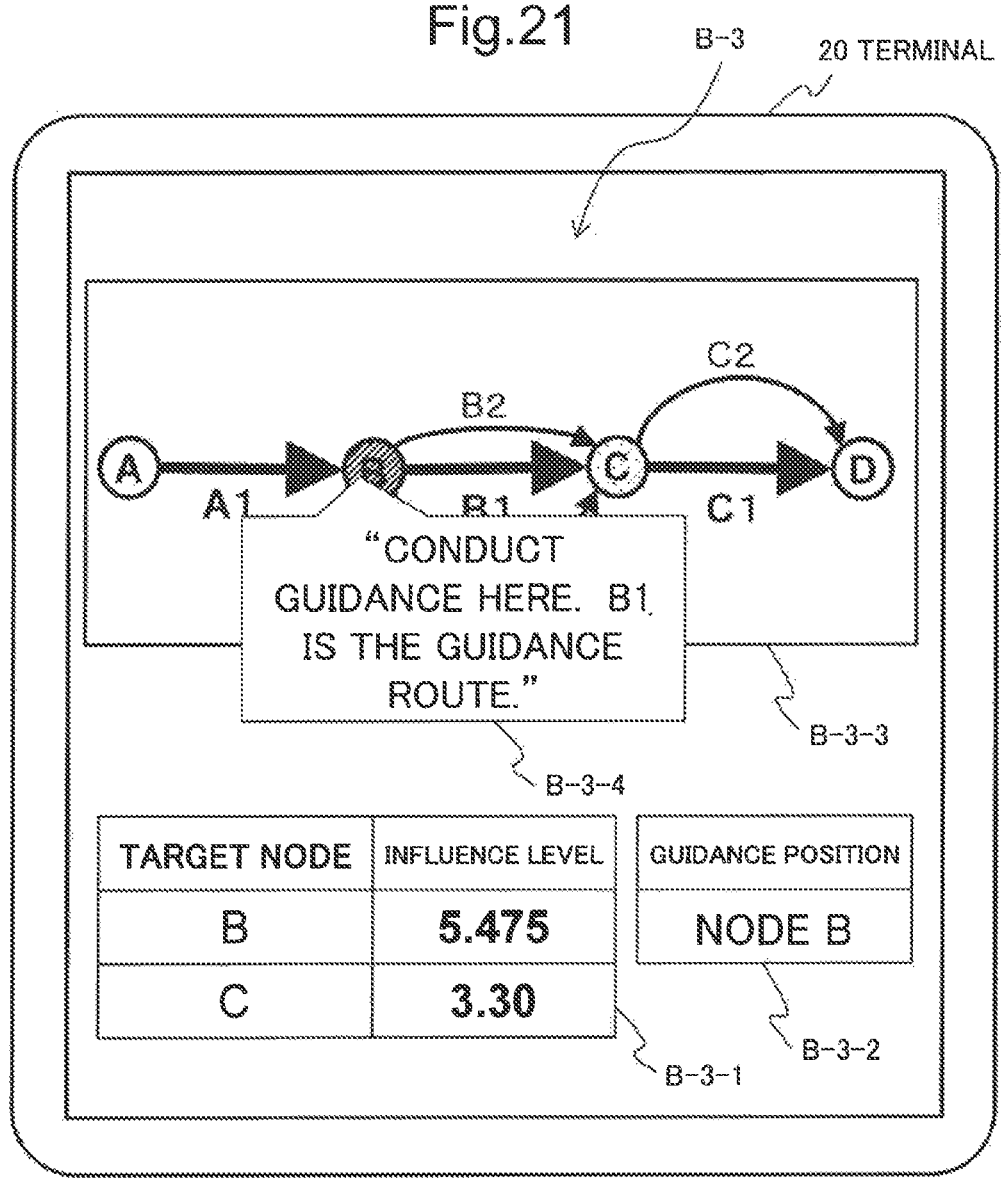
FIG. 21 is a view illustrating another example of the display screen which is displayed on the terminal, based on the output information, according to the second example embodiment of the present invention.

Next, another display mode of the terminal 20, which is based on the output information, is described by using to FIG. 21. FIG. 21 is a view illustrating another example of the display screen which is displayed on the terminal 20 on the basis of the output information concerning the second example embodiment of the present invention. In the case of the present example, the information output unit 106 outputs to the terminal 20 output information including the influence level information, the guidance position information, the influence level route information, and the guidance assistance information. The guidance assistance information is information for a guiding person to guide a guided person to a guidance route at a guidance position. The guidance assistance information is, for example, character string information including a notification content to a guiding person, which includes a guidance position, and a guidance route relating to a risk node. The information output unit 106 outputs the guidance assistance information by using the guidance route, the guidance position information and the influence level route information. In other words, the information output unit 106 outputs the guidance assistance information which is information for guiding a guided person to a guidance route at a guidance position on the basis of a guidance route, information relating to a route, and a guidance position.

A display screen B-3 of the terminal 20 illustrated in FIG. 21 displays influence level information B-3-1, guidance position information B-3-2, influence level route information B-3-3, and guidance assistance information B-3-4. For example, the guidance assistance information B-3-4, which the display screen B-3 illustrated in FIG. 21 displays, is "Conduct guidance here. B1 is the guidance route." The guidance assistance information indicates that the guidance position, at which a guiding person is to guide a guided person, is the node B, and that the guidance route of this node is the link B1.

In the guidance assistance system 1 according to the present example embodiment, the information output unit 106 outputs the output information including influence level information, influence level route information, guidance information and guidance assistance information. That enables a guiding person to confirm, from the terminal 20, an alert for instructing the guiding person to conduct guidance at a guidance position, and a guidance route, and therefore decreases the possibility that the guiding person mistakes the guidance position and a content of guidance when guidance assistance is conducted. Furthermore, that enables the guiding person to notify the guiding person of the guidance position and a guidance route which is a route that is to be instructed to the guided person. Since the guiding person can confirm, from this information, the guidance position and the guidance route, it is possible to properly assist the guiding person in guiding the guided person.

Figure 22:
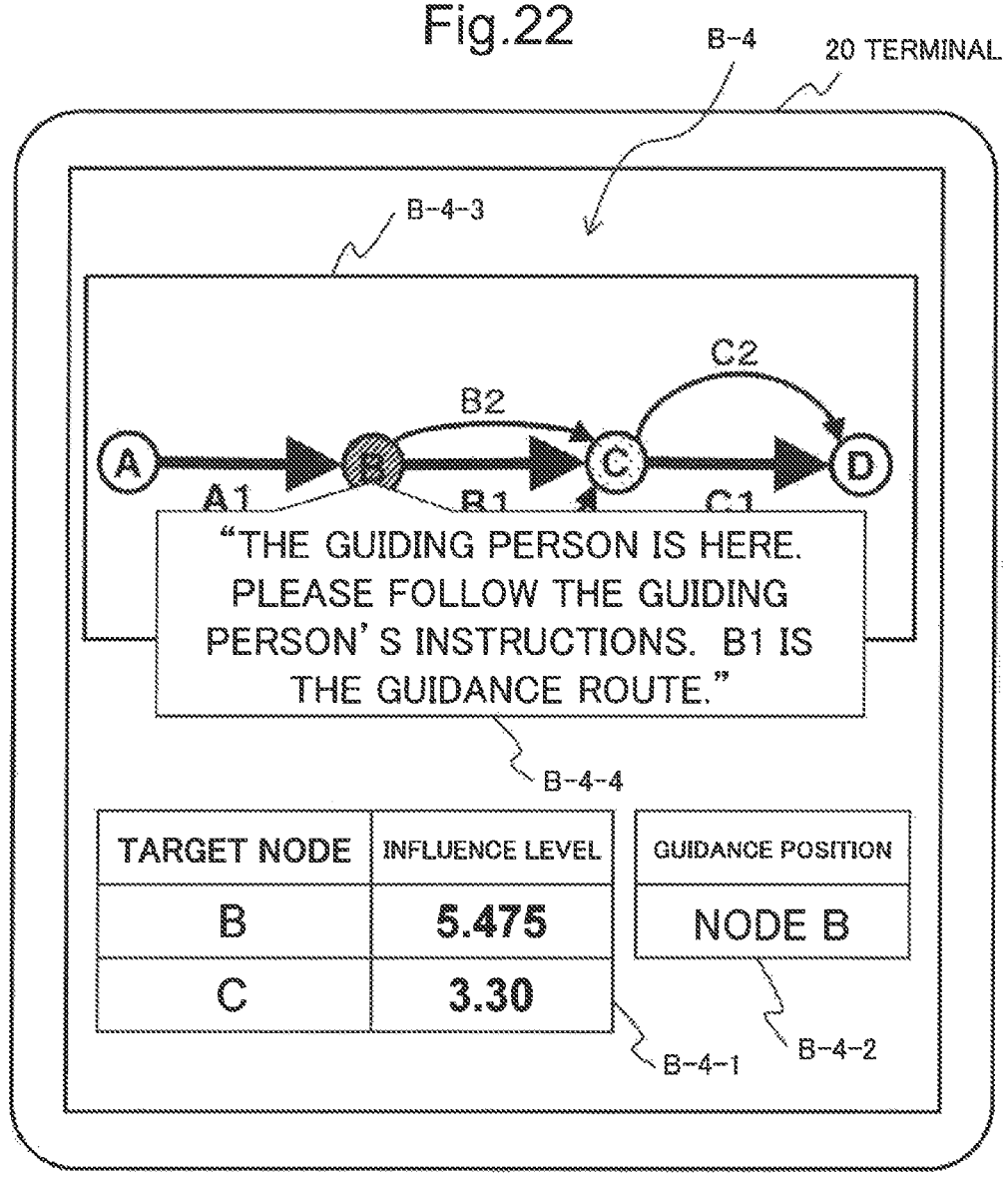
FIG. 22 is a view illustrating another example of the display screen which is displayed on the terminal, based on the output information, according to the second example embodiment of the present invention.

Next, another display mode of the terminal 20, which is based on the output information, is described by using FIG. 22. FIG. 22 is a view illustrating another example of the display screen which is displayed on the terminal 20 on the basis of the output information concerning the second example embodiment of the present invention. In the case of the present example, the information output unit 106 outputs to the terminal 20 output information including the influence level information, the guidance position information, the influence level route information, and the guidance information. A display screen B-4 of the terminal 20 illustrated in FIG. 22 displays influence level information B-4-1, guidance position information B-4-2, influence level route information B-4-3, and guidance information B-4-4. For example, the guidance information B-4-4, which the display screen B-4 illustrated in FIG. 22 displays, is "The guiding person is here. Please follow the guiding person's instructions. B1 is the guidance route." The guidance information indicates that the guidance position of the guiding person is the node B, and that the guidance route of this node is the link B1.

In the guidance assistance system 1 according to the present example embodiment, the information output unit 106 outputs the output information including the influence level information, the guidance position information, the influence level route information, and the guidance information. This enables notification of the presence of a guiding person, the position of the guiding person, and the guidance route to a guided person. Since the guided person can confirm, by this information, the guiding person, the guidance position and the guidance route, the guided person can be prevented from deviating from the guidance route when guidance assistance is conducted.

The guidance assistance system 1 of the present example embodiment may further include a wearable terminal including a sensor (e.g. a camera) in which crowd guidance analysis technology is implemented, may acquire the number of persons (i.e. traffic volume) in a crowd in real-time from the wearable terminal, may calculate the influence level from the traffic volume and the deviation level and the non-deviation level, and may output to the wearable terminal the position information of a node of a high rank in the value of the influence level, and the guidance information relating to this node. That causes the influence level to be calculated based on the real-time traffic volume, and therefore enables determination of a risk node (hereinafter, referred to also as "variable risk node"), which varies depending on a variation of the traffic volume. Moreover, since the position information of the variable risk node and the guidance information relating to this node can be output to the guiding person with the wearable terminal, the guiding person can move to the variable risk node at a proper timing, and can conduct the guidance.

The guidance assistance system 1 of the present example embodiment further includes a wearable terminal including a sensor in which crowd guidance analysis technology is implemented, and an acquisition unit that acquires position information of a plurality of wearable terminals. Based on the position information of wearable terminals, the guidance assistance system 1 may output to each of the wearable terminals position information of a node of a high rank in the value of the calculated influence level, and the guidance information relating to this node. Therefore, when the variable risk node changes, the position information of this node and the guidance information relating to this node can be output to a wearable terminal existing at a position near the variable risk node. Accordingly, the guiding person with this wearable terminal can shorten the time of movement to a node, and can limit the occurrence of erroneous travel of the guided person to a minimum.

Third Example Embodiment

Figure 23:
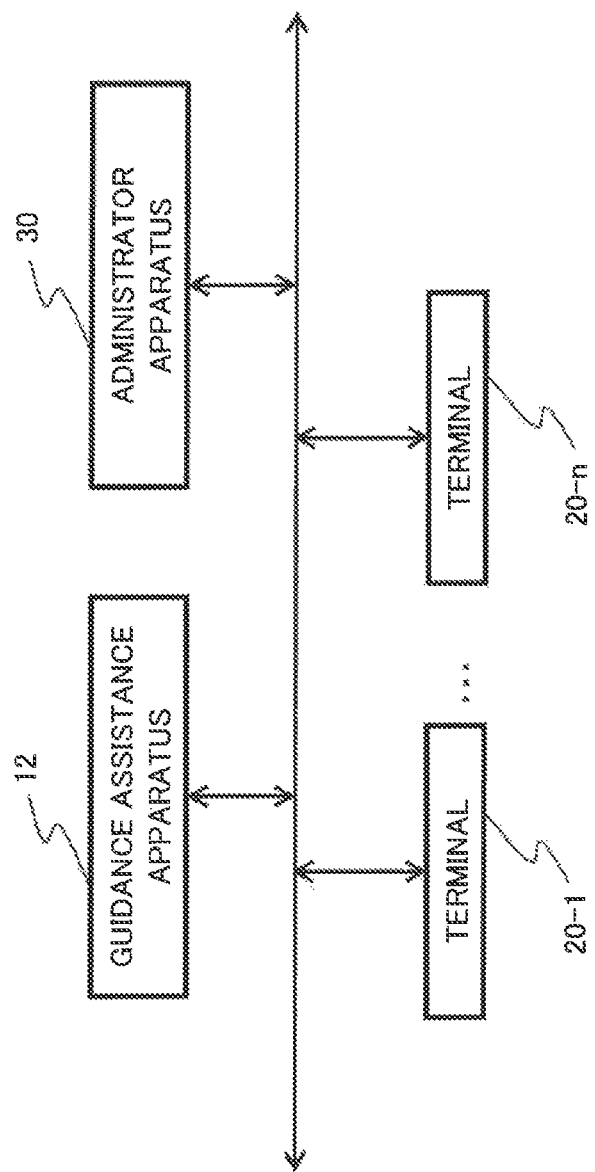
FIG. 23 is a view illustrating an operational configuration of a guidance assistance system according to a third example embodiment of the present invention.

Next, a third example embodiment is described. In the second example embodiment, guidance assistance information is output to a guiding person. In the present example embodiment, guidance instruction information is output to an administrator. FIG. 23 is a view illustrating an operational configuration of a guidance assistance system 1 according to the third example embodiment of the present invention. As illustrated in FIG. 23, the guidance assistance system 1 according to the present example embodiment includes an administrator apparatus 30 in addition compared with the operational configuration of the guidance assistance system of the first example embodiment. In other words, a guidance assistance apparatus 12, terminals 20 and the administrator apparatus 30 are connected via a network such as the Internet or a local area network (LAN) in the configuration.

The administrator apparatus 30 is an information processing apparatus, such as a PC, used by the a responsible person or the like (hereinafter referred to as "administrator") in guidance for performing assist in selection of a guiding person, and notification to the guiding person by using output information including the influence level information calculated by the guidance assistance apparatus 12. The administrator apparatus 30 is achieved by the computer apparatus 50 illustrated in FIG. 2, similarly to the guidance assistance apparatus 10 or terminal 20 included in the guidance assistance system 1 according to the first example embodiment.

Figure 24:
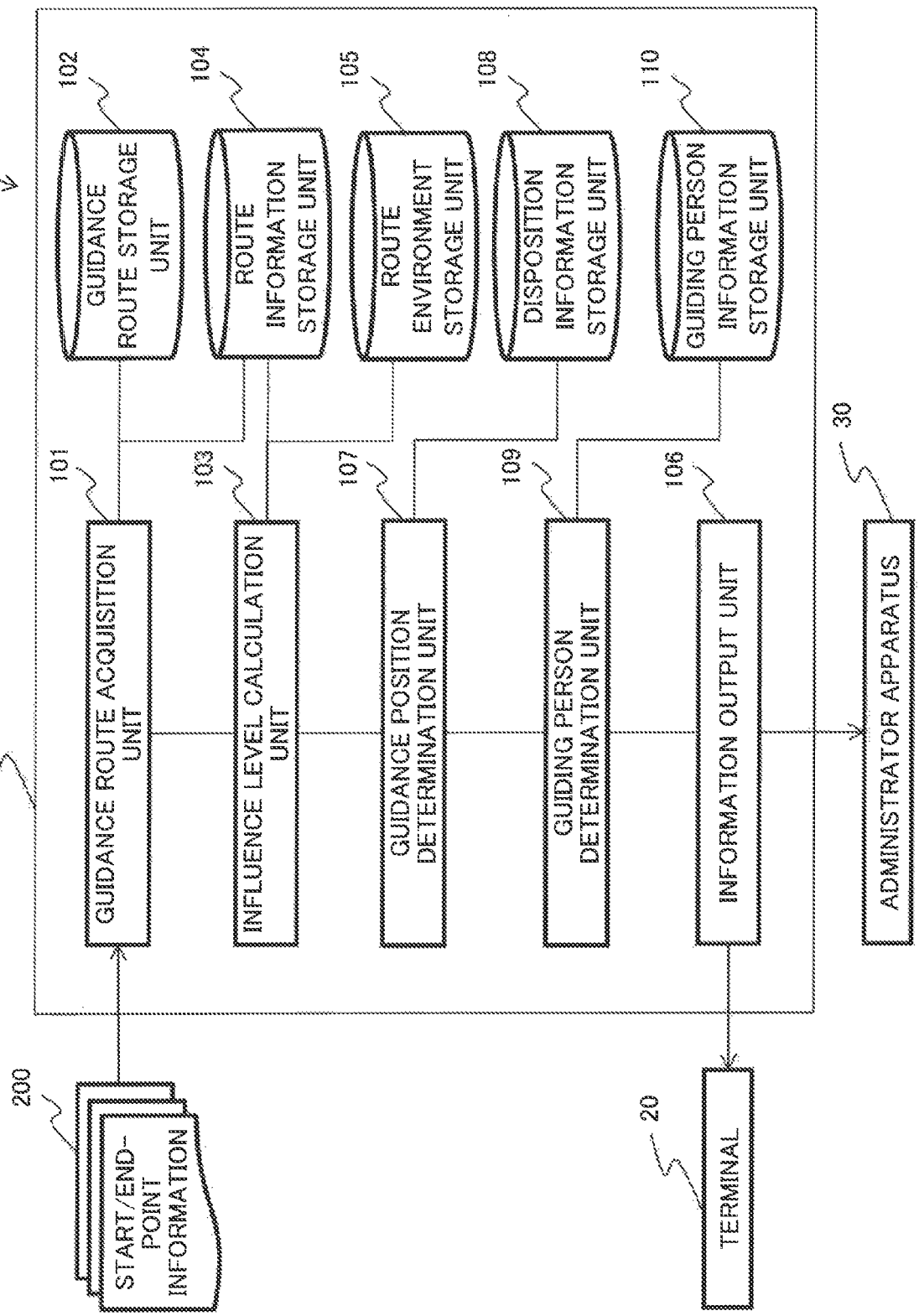
FIG. 24 is a block diagram illustrating a functional configuration of a guidance assistance apparatus according to the third example embodiment of the present invention.

Next, functions of the guidance assistance apparatus 12 included in the guidance assistance system 1 according to the present example embodiment is described. FIG. 24 is a block diagram illustrating a functional configuration of the guidance assistance apparatus 12 according to the third example embodiment of the present invention. As illustrated in FIG. 24, the guidance assistance system 1 according to the present example embodiment includes the guidance assistance apparatus 12, the terminal 20 and the administrator apparatus 30. The guidance assistance apparatus 12 of the present example embodiment includes a disposition information storage unit 108, a guiding person determination unit 109 and a guiding person information storage unit 110 in addition compared with the configuration of the guidance assistance apparatus 11 of the second example embodiment.

The guidance route acquisition unit 101 acquires start/end-point information 200 which is information on a departure place and destination place of a guided person who utilizes a terminal 20, and acquires a guidance route relating to the start/end-point information 200 and a target area relating to the guidance route from the guidance route information stored in a guidance route storage unit 102.

FIG. 25 is a view illustrating an example of guidance route information stored in the guidance route storage unit 102 according to the third example embodiment of the present invention. The guidance route storage unit 102 is a storage medium which stores guidance route information acquired by the guidance route acquisition unit 101. As illustrated in FIG. 25, in the guidance route information of the present example embodiment, a guidance route is associated with a start-point node and an end-point node and a target area that is an area to which the guidance route relates. For example, as illustrated in FIG. 25, the guidance route information indicates that the guidance route is "A1→B1→C1" and the target area is "X area" in a case where the start-point node is A and the end-point node is D.

The guidance position determination unit 107 determines a guidance position on the basis of the target area acquired by the guidance route acquisition unit 101, the influence level calculated by the influence level calculation unit 103 for each node, and disposition information stored in the disposition information storage unit 108. The disposition information is information that is a condition for determining the guidance position. FIG. 26 is a view illustrating an example of the disposition information according to the third example embodiment of the present invention. As illustrated in FIG. 26, in the disposition information, a disposition area, which is a target area where a guiding person is disposed, and a disposition number indicative of a value of the number of guiding persons, who can be disposed at the guidance position, are associated. As illustrated in FIG. 26, in the disposition information, for example, the disposition number is "1" when the disposition area is "X area". This disposition information indicates that one guiding person can be disposed at the guidance position when the target area is the X area.

The guidance position determination unit 107 acquires a disposition number on the basis of the target area and the disposition information, and determines, one by one for the disposition number, a target node as a guidance position in descending order of influence levels. For example, when the target area is "X area", the guidance route is "A1→B1→C1", as illustrated in FIG. 25, and thus the target nodes are "node B" and "node C". As illustrated in FIG. 12, the influence level of the "node B" is 5.475, and the influence level of "node C" is 3.30. In addition, as illustrated in FIG. 26, the disposition number of the "X area" is "1". Accordingly, the guidance position determination unit 107 determines the node B, which is one target node with the highest influence level, as a guidance position.

The guiding person determination unit 109 determines a target guiding person who is a guiding person that is to conduct guidance at the guidance position on the basis of the target area acquired by the guidance route acquisition unit 101, the guidance position determined by the guidance position determination unit 107, and guiding person information stored in the guiding person information storage unit 110. The guiding person information is information relating to a guiding person who is disposed at the guidance position. FIG. 27 is a view illustrating an example of the guiding person information concerned with the third example embodiment of the present invention. As illustrated in FIG. 27, in the guiding person information, a guiding person (e.g., "guiding person's name" which is the name of a guiding person in FIG. 27) and a "charge area", which is an area in which the guiding person is in charge of guidance, are associated. As illustrated in FIG. 27, in the guiding person information, for example, the charge area is "X area" when the guiding person's name is "Nippon Taro". This guiding person information indicates that Nippon Taro is in charge of guidance in the X area.

The guiding person determination unit 109 determines, as a target guiding person/target guiding persons, a guiding person/guiding persons of which charge area corresponds to the target area and of which number corresponds to the number (i.e. the disposition number) of a guidance position/guidance positions. For example, when the target area is "X area", the disposition number of the disposition area that is "X area" is "1", as illustrated in FIG. 26. In addition, as illustrated in FIG. 27, the guiding person's name of the control area that is "X area" is "Nippon Taro". Accordingly, the guiding person determination unit 109 determines, as a target guiding person, "Nippon Taro" who is the guiding person whose control area is the "X area" that is the target area. In other words, the guiding person determination unit 109 determines a target guiding person that is a guiding person who should conduct guidance at a guidance position on the basis of the guidance position and the information relating to the guiding person.

The information output unit 106 outputs output information including the target area, the influence level, the guidance position and the target guiding person information. As illustrated in FIG. 24, the information output unit 106 outputs, for example, the output information to the terminal 20 and administrator apparatus 30. In the target guiding person information, a guiding person determined by the guiding person determination unit 109 is associated with the name of the guiding person's name. For example, in the target guiding person information, the guiding person's name is "Nippon Taro". This target guiding person information indicates that the target guiding person, who conducts guidance at the guidance position, is Nippon Taro. In other words, the information output unit 106 outputs the target guiding person information including the target guiding person.

The terminal 20 displays the output information which the information output unit 106 outputs. A display mode of the terminal 20, which is based on the output information, is described later.

The administrator apparatus 30 displays the output information which the information output unit 106 outputs. A display mode of the administrator apparatus 30, which is based on the output information, is described later.

Figure 28:
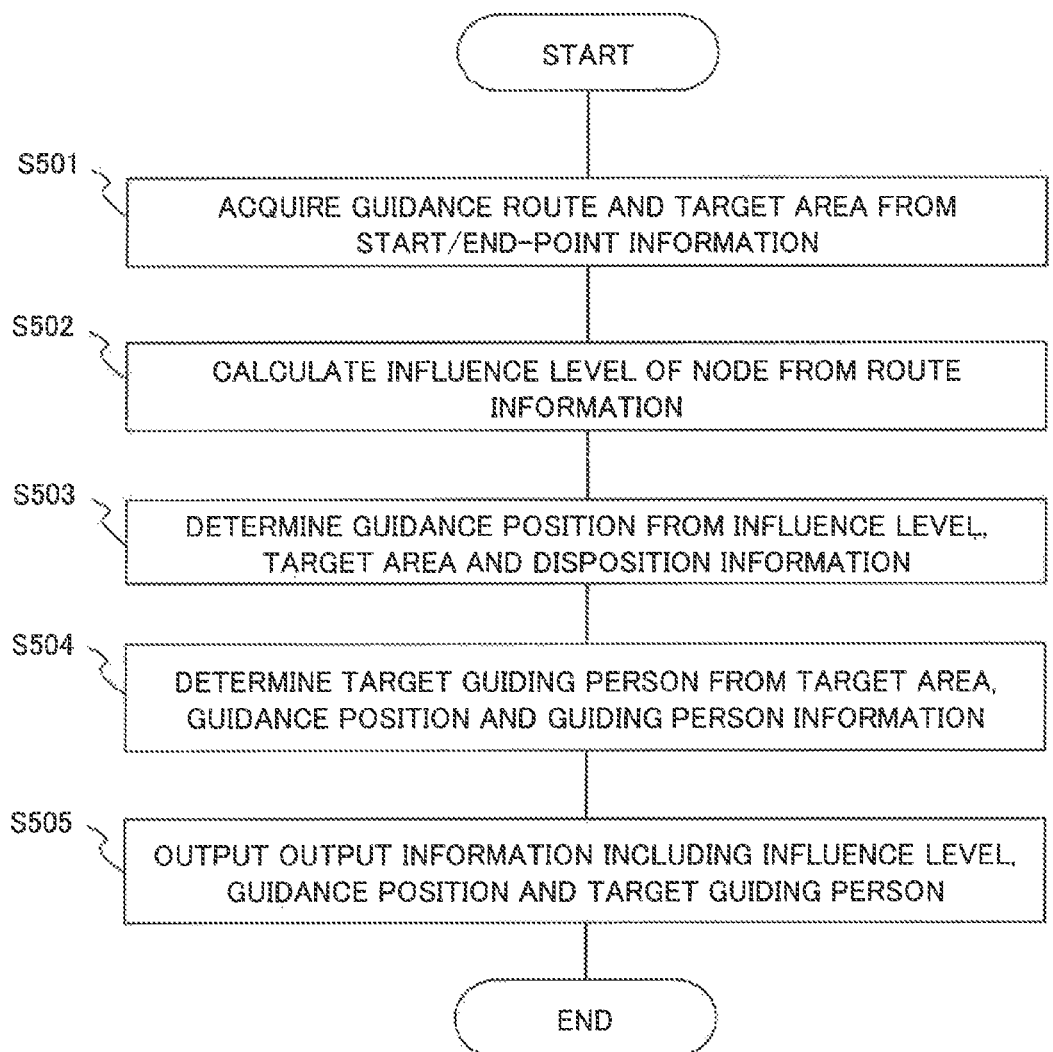
FIG. 28 is a flowchart illustrating an operation example of the guidance assistance apparatus according to the third example embodiment of the present invention.

Next, the operation of the guidance assistance apparatus 12 according to the present example embodiment is described. FIG. 28 is a flowchart illustrating an operation example of the guidance assistance apparatus 12 according to the third example embodiment of the present invention. The guidance route acquisition unit 101 acquires a guidance route and a target area from the start/end-point information 200 which is input (step S501). The influence level calculation unit 103 calculates an influence level of a node from the guidance route acquired by the guidance route acquisition unit 101 and the route information thereof (step S502). The guidance position determination unit 107 determines a guidance position on the basis of the influence level of the node, calculated by the influence level calculation unit 103, the target area acquired by the guidance route acquisition unit 101, and the disposition information stored in the disposition information storage unit 108 (step S503). The guiding person determination unit 109 determines a target guiding person on the basis of the target area, the guidance position determined by the guidance position determination unit 107, and the guiding person information stored in the guiding person information storage unit 110 (step S504). The information output unit 106 outputs the output information including the influence level of the node, the guidance position, and the target guiding person determined by the guiding person determination unit 109 (step S505).

By this process, the guidance assistance apparatus 12 acquires the guidance route, calculates the influence level of the node, determines the guidance position, determines the guiding person, and outputs the output information.

Figure 29:
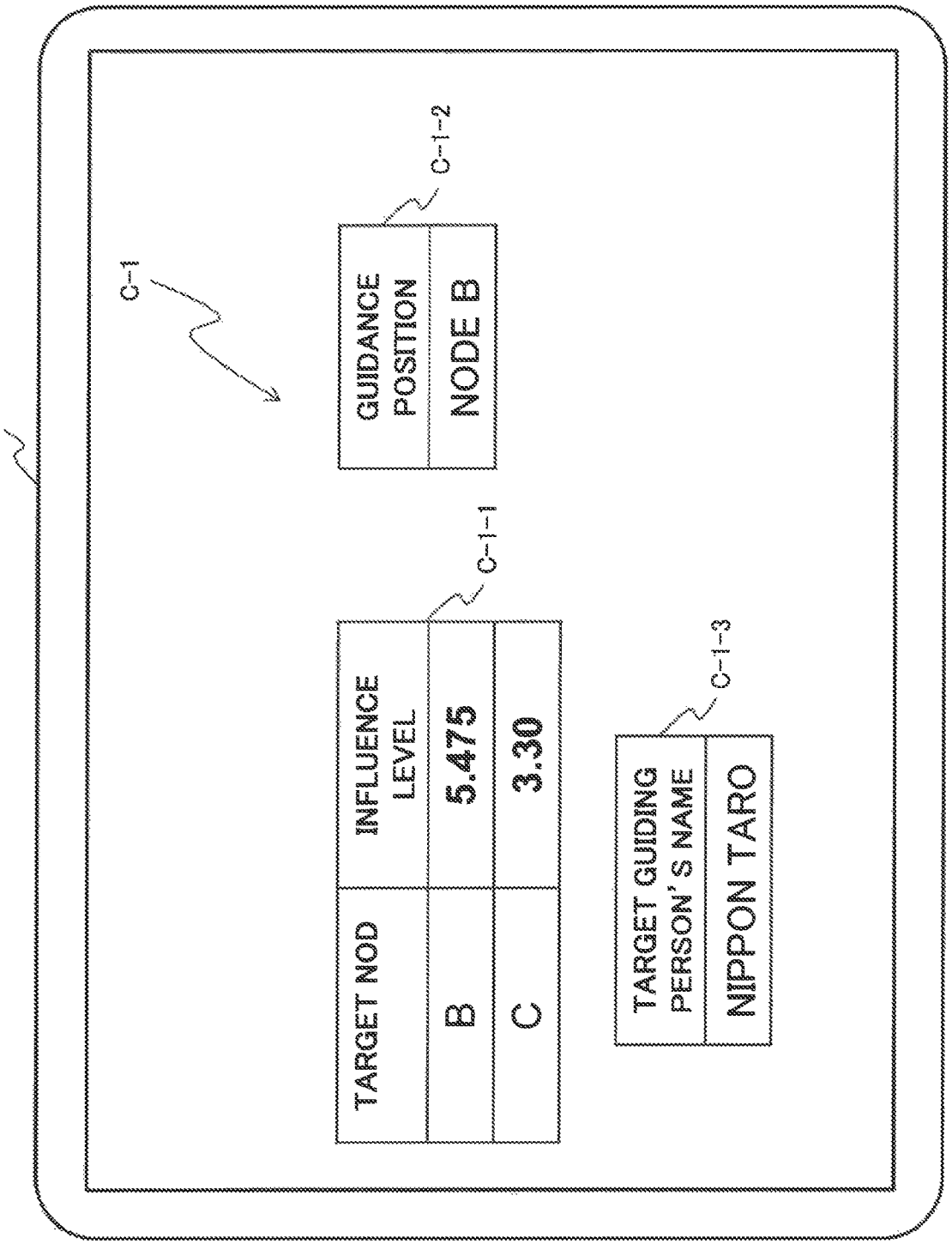
FIG. 29 is a view illustrating an example of a display screen which is displayed on the terminal or an administrator apparatus, based on the output information, according to the third example embodiment of the present invention.

Next, a display mode of the terminal 20 and administrator apparatus 30, which is based on the output information, is described by using FIG. 29. FIG. 29 is a view illustrating an example of a display screen which is displayed on the terminal 20 and administrator apparatus 30 on the basis of the output information according to the third example embodiment of the present invention. In the case of the present example, the information output unit 106 outputs to the terminal 20 output information including an influence level, a guidance position and target guiding person information. A display screen C-1 of the terminal 20 and administrator apparatus 30, which is illustrated in FIG. 29, displays influence level information C-1-1, guidance position information C-1-2 and target guiding person information C-1-3. The influence level information C-1-1 of the present example embodiment has the same configuration as that of the influence level information A-1-1 of the first example embodiment, and therefore a description thereof is omitted. The guidance position information C-1-2 of the present example embodiment has the same configuration as that of the guidance position information B-1-2 of the second example embodiment, and therefore a description thereof is omitted. As illustrated in FIG. 29, the guidance position information C-1-3 includes a target guiding person and the name of the guiding person. For example, in the output information which the display screen C-1 displays, the "target guiding person's name" is "Nippon Taro".

As described above, the guidance assistance system 1 according to the present example embodiment determines the guidance position based on the influence level for each target node, the target area and the disposition information. The influence level is calculated from the guidance route, the route information and the route environment information. The guidance assistance system 1 determines the target guiding person based on the determined guidance position, the target area and the guiding person information. The guidance assistance system 1 determines outputs the output information including the calculated influence level and the determined target guiding person and guidance position to the terminal 20 and administrator apparatus 30 and causing them to be displayed.

That enables the guiding person to confirm, by the terminal 20, the output information including the target guiding person, and therefore enables performance of guidance assistance with consideration given to the influence on the guided person of the guided person's deviation from the guidance route. In addition, that decreases the possibility that the guided person deviates from the guidance route at the risk node when guidance assistance is conducted. Furthermore, that enables the administrator to confirm, from the administrator apparatus 30, the output information including the guidance position and the target guiding person, and therefore enables the administrator to select a proper guiding person when guidance assistance is conducted.

Figure 30:
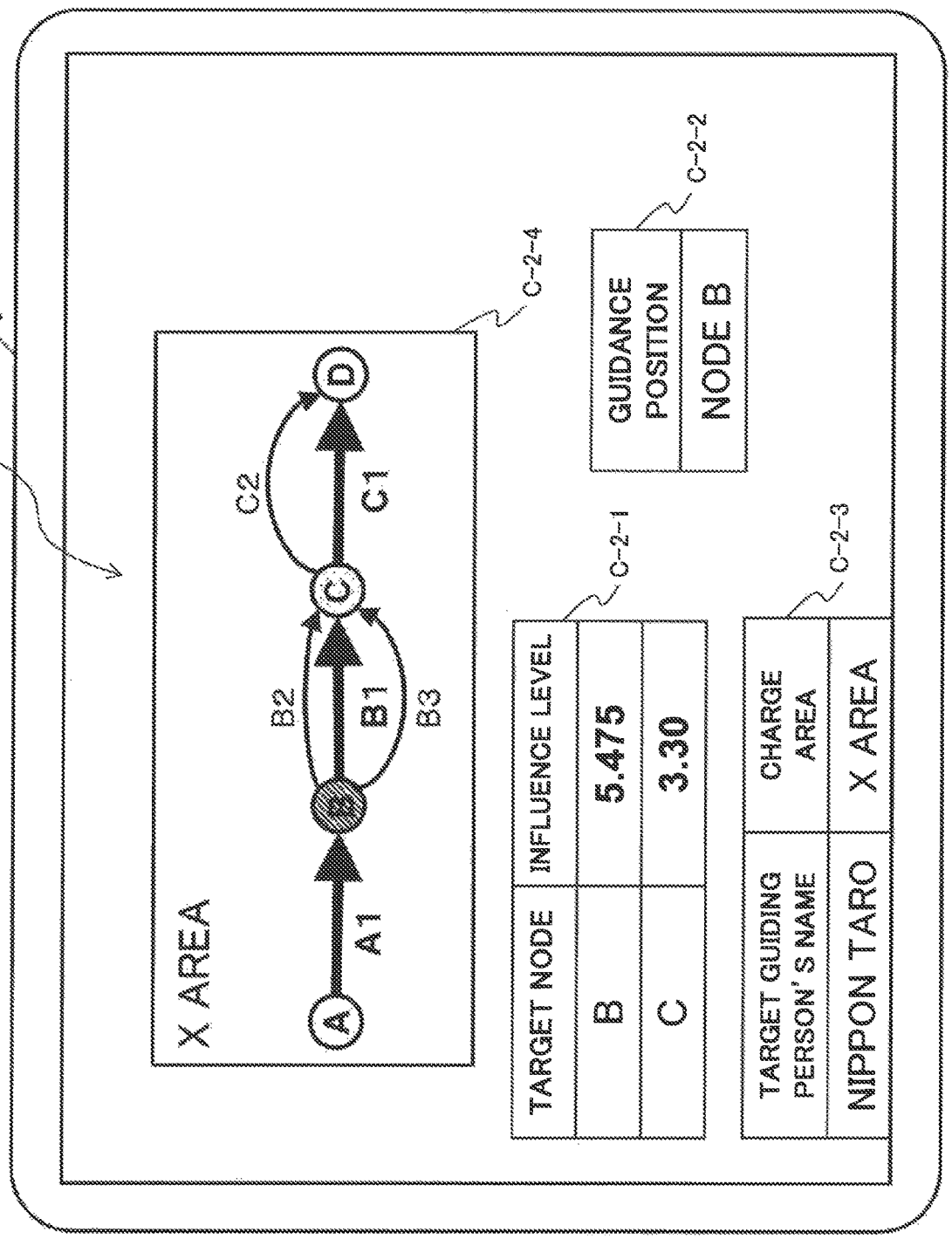
FIG. 30 is a view illustrating another example of the display screen which is displayed on the terminal or the administrator apparatus, based on the output information, according to the third example embodiment of the present invention.

In the third example embodiment, the display mode of the terminal 20 and administrator apparatus 30 illustrated in FIG. 29 is described as a concrete example. However, this is merely an example, and the display mode of the terminal 20 and administrator apparatus 30 may be another display mode. Hereinafter, another display mode of the terminal 20 and administrator apparatus 30, which is based on the output information, is described with reference to FIG. 30. Another display mode of the terminal 20, which is based on the output information, is described with reference to FIG. 31. Other display modes of the administrator apparatus 30, which are based on the output information, is described with reference to FIG. 32 and FIG. 33. FIG. 30 is a view illustrating another example of the display screen which is displayed on the terminal 20 and administrator apparatus 30 on the basis of the output information according to the third example embodiment of the present invention. In the case of the present example, the information output unit 106 outputs to the terminal 20 and administrator apparatus 30 the output information including the influence level information, the guidance position information, the target guiding person information and the influence level route information. A display screen C-2 of the terminal 20 and administrator apparatus 30, which is illustrated in FIG. 30, displays influence level information C-2-1, guidance position information C-2-2, target guiding person information C-2-3, and influence level route information C-2-4.

The target guiding person information C-2-3 of the present example embodiment includes a control area in addition compared with the configuration of the target guiding person information C-1-3. As illustrated in FIG. 30, the target guiding person information C-2-3 includes "X area" which is a charge area of a target guiding person in addition to the target guiding person information C-1-3 illustrated in FIG. 29. The influence level route information C-2-4 of the present example embodiment includes a target area in addition compared with the configuration of the influence level route information A-2-2 of the first example embodiment. As illustrated in FIG. 30, the influence level route information C-2-4 includes "X area" which is the target area of the guidance route, in addition to the influence level route information A-2-2 illustrated in FIG. 15. This influence level route information is indicative of the influence level route information of the X area.

Figure 31:
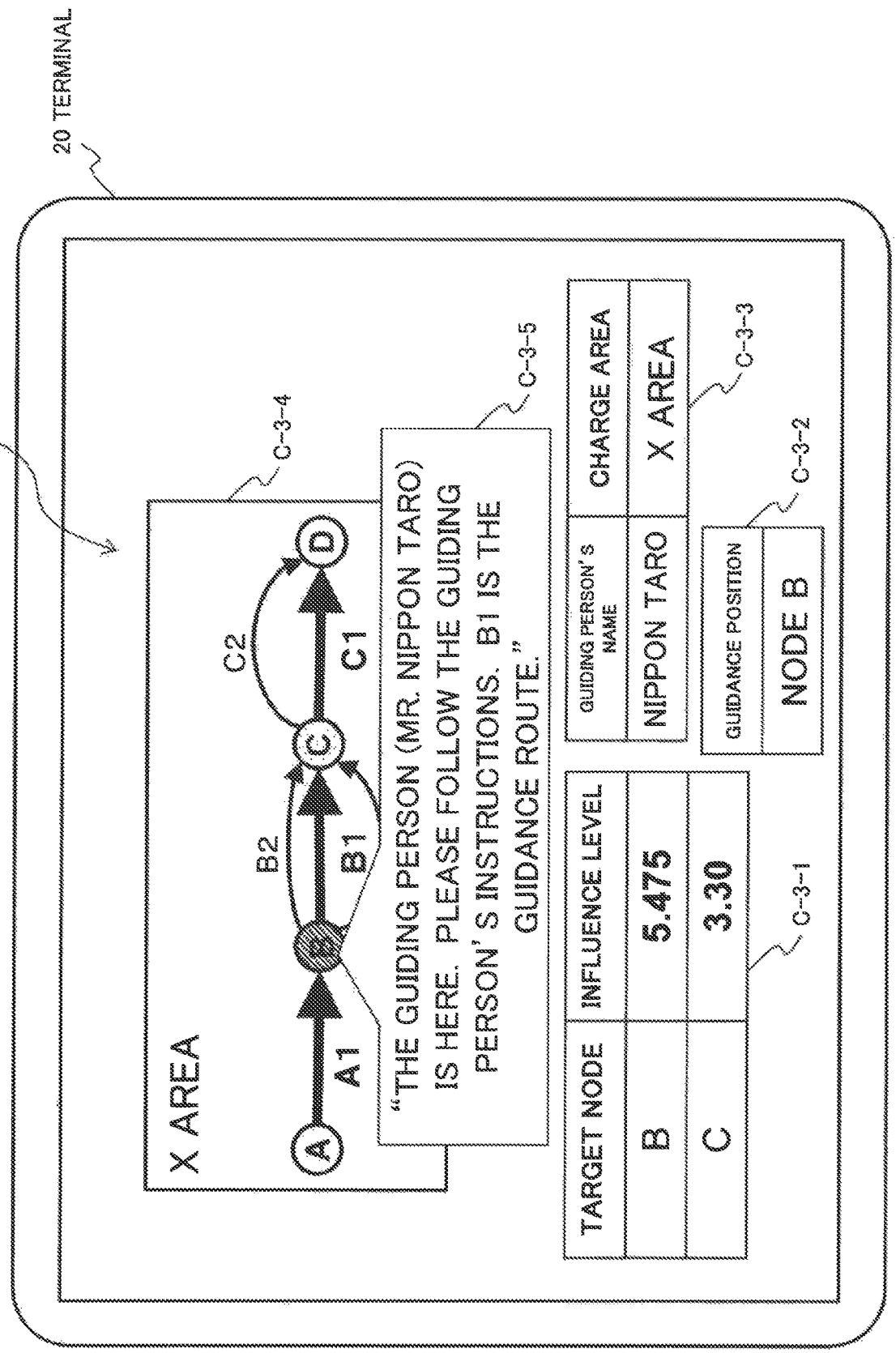
FIG. 31 is a view illustrating another example of the display screen which is displayed on the terminal, based on the output information, according to the third example embodiment of the present invention.

Next, another display mode of the terminal 20, which is based on the output information, is described by using FIG. 31. FIG. 31 is a view illustrating another example of the display screen which is displayed on the terminal 20 on the basis of the output information according to the third example embodiment of the present invention. In the case of the present example, the information output unit 106 outputs to the terminal 20 output information including the influence level information, the guidance position information, the target guiding person information, the influence level route information, and the guidance assistance information. A display screen C-3 of the terminal 20, which is illustrated in FIG. 31, displays influence level information C-3-1, guidance position information C-3-2, target guiding person information C-3-3, influence level route information C-3-4, and guidance information C-3-5. The guidance information C-3-5 of the present example embodiment includes a target guiding person's name in addition compared with the configuration of the guidance information B-4-4 of the second example embodiment. For example, the guidance information C-3-5, which the display screen C-3 illustrated in FIG. 31 displays, is "The guiding person (Mr. Nippon Taro) is here. Please follow the guiding person's instructions. B1 is the guidance route." The guidance information indicates that Mr. Nippon Taro, who is the target guiding person, guides a guided person at the node B that is the guidance position, and that the guidance route of this node is the link B1.

In the guidance assistance system 1 according to the present example embodiment, the information output unit 106 outputs the output information including the influence level information, the guidance position information, the target guiding person information, the influence level route information, and the guidance assistance information. This enables notification of a name of a guiding person, a guidance position of the guiding person, and a guidance route to a guided person. This enables the guided person to confirm, by that information, the guiding person, the guidance position and the guidance route, and therefore enables the guided person to be prevented from deviating from the guidance route when guidance assistance is conducted.

Figure 32:
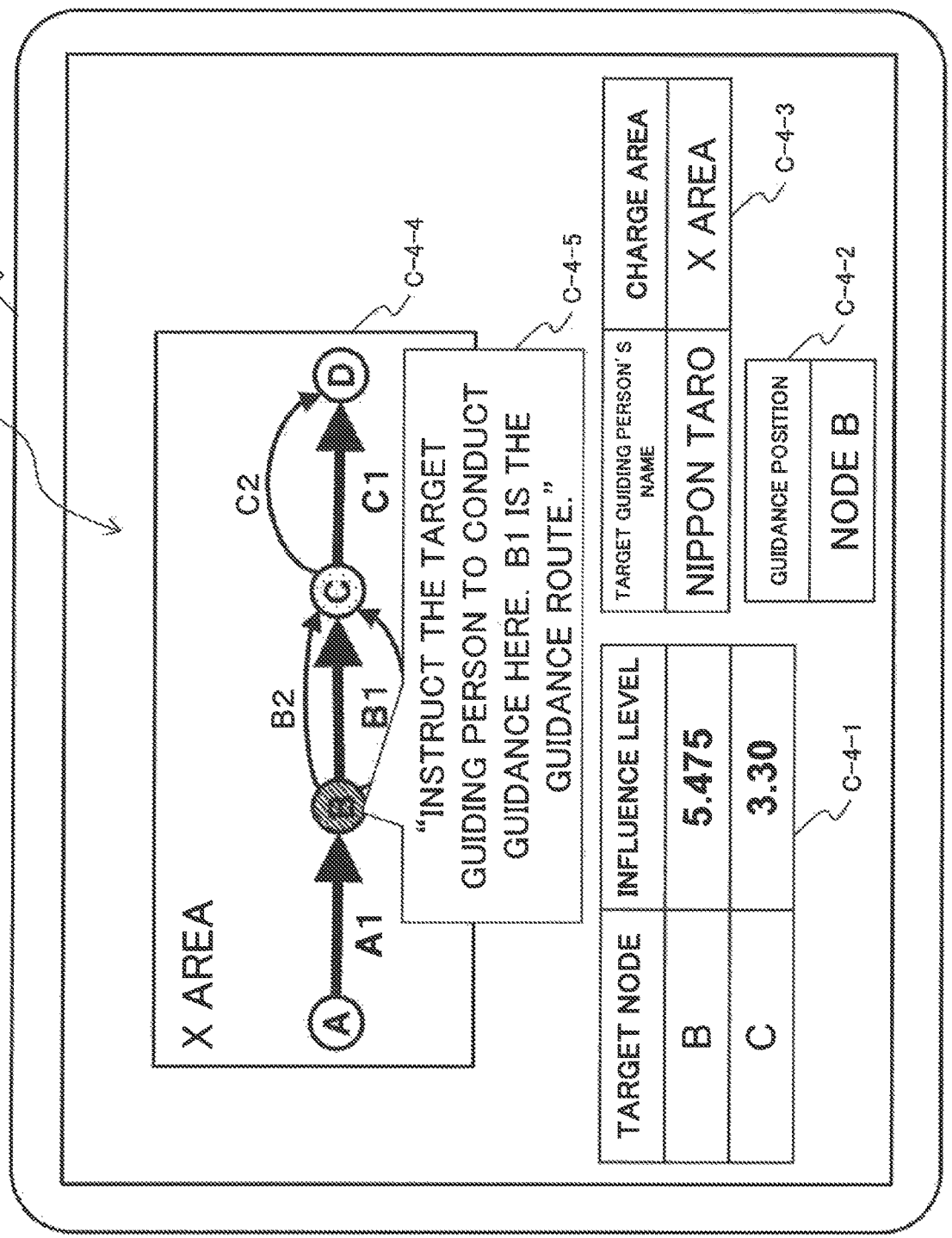
FIG. 32 is a view illustrating another example of the display screen which is displayed on the administrator apparatus, based on the output information, according to the third example embodiment of the present invention.

Next, another display mode of the administrator apparatus 30, which is based on the output information, is described by using FIG. 32. FIG. 32 is a view illustrating another example of the display screen which is displayed on the administrator apparatus 30 on the basis of the output information according to the third example embodiment of the present invention. In the case of the present example, the information output unit 106 outputs to the administrator apparatus 30 output information including the influence level information, the guidance position information, the target guiding person information, the influence level route information, and the guidance instruction information. The guidance instruction information is information for guiding the target guiding person to the guidance position. The guidance instruction information is, for example, character string information that is a content of notification including a guidance route, a guidance position and a target guiding person to an administrator. A display screen C-4 of the administrator apparatus 30, which is illustrated in FIG. 32, displays influence level information C-4-1, guidance position information C-4-2, target guiding person information C-4-3, influence level route information C-4-4, and guidance instruction information C-4-5. For example, the guidance instruction information C-4-5, which the display screen C-4 illustrated in FIG. 32 displays, is "Instruct the target guiding person to conduct guidance here. B1 is the guidance route." This guidance instruction information indicates that the target guiding person is Nippon Taro, the guidance position is the node B, and the guidance route relating to the node B is the link B1. The information output unit 106 outputs the guidance instruction information by using the guidance route, the guidance position information, the influence level route information and the target guiding person information. In other words, the information output unit 106 outputs the guidance instruction information that is information for guiding the target guiding person to the guidance position on the basis of the guidance route, the information relating to the routes, the guidance position, and the target guiding person.

In the guidance assistance system 1 according to the present example embodiment, the information output unit 106 outputs the output information including the influence level information, the guidance position information, the target guiding person information, the influence level route information, and the guidance instruction information. This enables the administrator to confirm, by the administrator apparatus 30, an alert for instructing the target guiding person to conduct guidance at the guidance position, and the guidance route, and therefore can decrease the possibility that an administrator gives an instruction of wrong content to a guiding person when guidance assistance is conducted.

Figure 33:
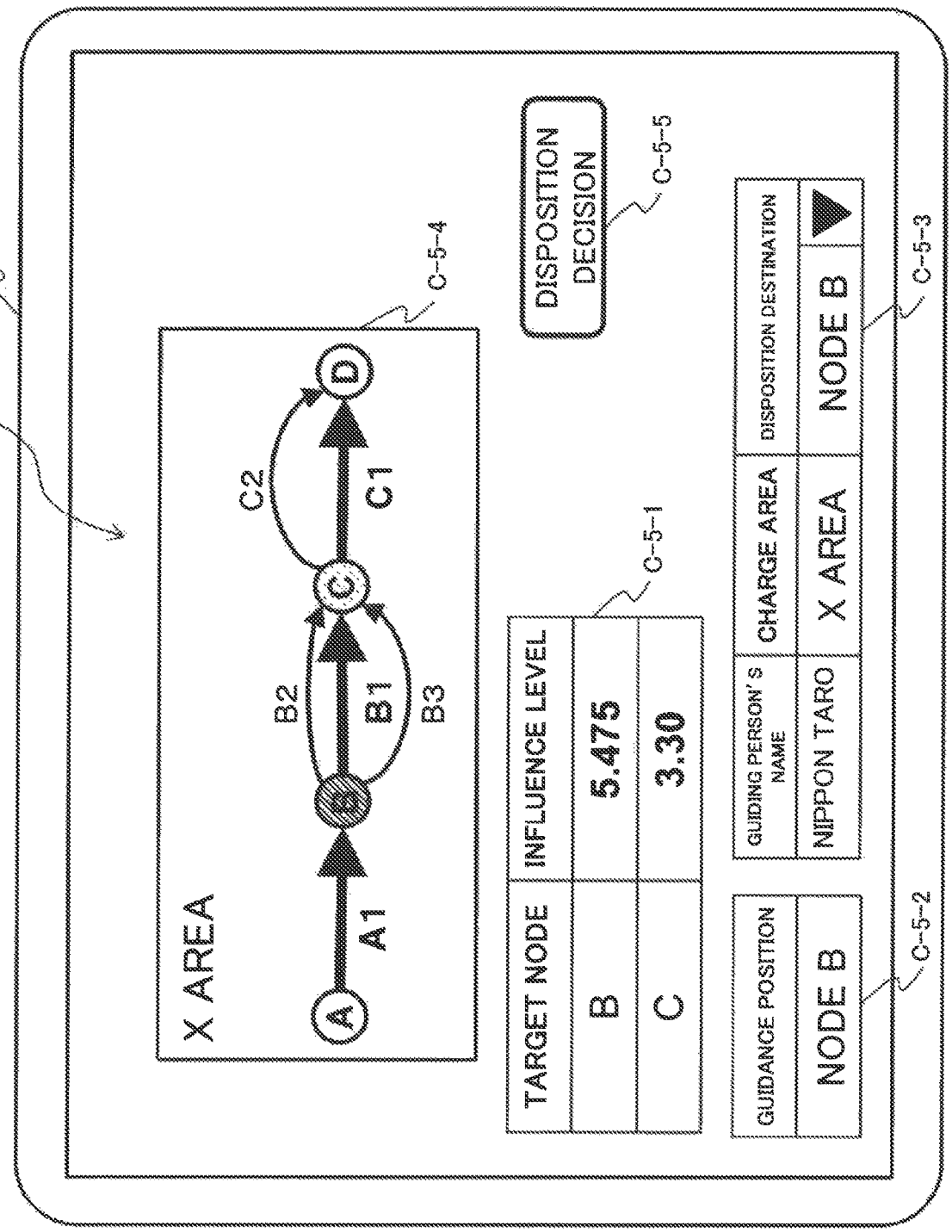
FIG. 33 is a view illustrating another example of the display screen which is displayed on the administrator apparatus, based on the output information, according to the third example embodiment of the present invention.

Next, another display mode of the administrator apparatus 30, which is based on the output information, is described by using FIG. 33. FIG. 33 is a view illustrating another example of the display screen which is displayed on the administrator apparatus 30 on the basis of the output information according to the third example embodiment of the present invention. In the case of the present example, the information output unit 106 outputs to the administrator apparatus 30 output information including the influence level information, the guidance position information, the target guiding person information, the influence level route information, and a decision button. The decision button is, for example, a GUI button which enables the administrator to execute an input operation (i.e. selection) by an input device included in the administrator apparatus 30. For example, by the administrator pressing the decision button by using the input device, the target guiding person and the guidance position are determined. A display screen C-5 of the administrator apparatus 30, which is illustrated in FIG. 33, displays influence level information C-5-1, guidance position information C-5-2, target guiding person information C-5-3, influence level route information C-5-4, and a decision button C-5-5. The target guiding person information C-5-3 of the present example embodiment includes a disposition button in addition compared with the configuration of the target guiding person information C-4-3. The disposition button is a button for enabling selection of the guidance position. For example, the target guiding person information C-5-3, which the display screen C-5 illustrated in FIG. 33 displays, includes "disposition destination" including "node B" that is the guidance position in addition to the target guiding person information C-2-3 illustrated in FIG. 30. For example, the target guiding person information C-5-3 is information which proposes to the administrator who uses the administrator apparatus 30 that "Nippon Taro" who is the target guiding person is to be disposed at the node B. The administrator confirms the proposed target guiding person information C-5-3, and presses the decision button C-5-5 when there is no change to the guiding person or disposition destination. This causes the decision information based on the disposition destination, which is proposed in the target guiding person information C-5-3, to be output (i.e. transmitted) to the guidance assistance apparatus 12.

When the administrator wishes to change the disposition destination of the presented target guiding person information C-5-3, for example, the administrator inputs (i.e. selects) another guidance position (e.g. "node C") from a pull-down list of "disposition destination" by using the input device included in the administrator apparatus 30, and presses the decision button C-5-5. This causes decision information, on which the change of the disposition destination by the administrator is reflected, to be output (i.e. transmitted) to the guidance assistance apparatus 12. When the guidance assistance apparatus 12 receives the decision information, the information output unit 106 outputs the output information, which is based on the decision information, to the terminal 20. This output information includes the influence level information, the guidance position information, the influence level route information and the guidance assistance information. For example, the display screen, which is displayed on the terminal 20 on the basis of the output information, is the display screen B-3 of the terminal 20 illustrated in FIG. 21.

In the guidance assistance system 1 according to the present example embodiment, the guidance assistance apparatus 12 outputs to the administrator apparatus 30 the output information including the influence level information, the guidance position information, the target guiding person information, the influence level route information, and the decision button, the administrator apparatus 30 outputs the decision information based on this output information, and the guidance assistance apparatus 12 outputs the output information based on the decision information to the terminal 20. This enables the administrator to dispose, by the administrator apparatus 30, the target guiding person at a proper disposition destination, and therefore can reduce the load on the administrator of the work of selecting the guiding person. Furthermore, that enables an administrator to confirm and change a position of disposition of a guiding person, which is automatically set by the guidance assistance apparatus 12 of the present example, and can respond flexibly to selection of a guiding person by the administrator.

The present example embodiment is described on assumption that the target guiding person information C-5-3 includes a disposition button. However, the guiding person's name and the control area each, which are included in the target guiding person information C-5-3, may include buttons which enable selection of items. Concretely, in a case in which a selectable button is included in the item of the guiding person's name, the target guiding person information C-5-3 enables selection of a guiding person of which the charge area corresponds to the "X area". This enables the administrator to confirm and change a guiding person or a position, which are automatically set, and therefore can respond flexibly to selection of a guiding person by an administrator.

Fourth Example Embodiment

Figure 34:
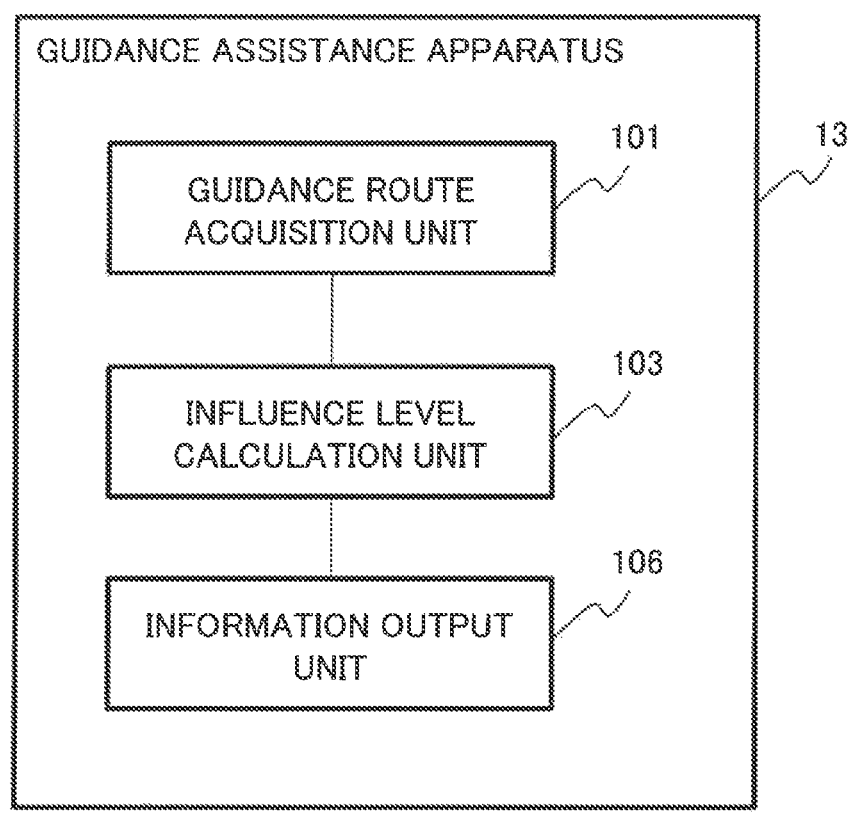
FIG. 34 is a block diagram of a guidance assistance apparatus according to a fourth example embodiment of the present invention.

FIG. 34 is a schematic configurational view of a guidance assistance apparatus 13 according to a fourth example embodiment of the present invention. FIG. 34 illustrates a configuration example for enabling the guidance assistance apparatus 13 to function as an apparatus which outputs output information including an influence level on the basis of a guidance route based on start/end-point information 200, route information, and route environment information. The guidance assistance apparatus 13 includes a guidance assistance acquisition unit 101, an influence level calculation unit 103 and an information output unit 106. The guidance assistance acquisition unit 101 acquires, from routes from a start-point position to an end-point position, a guidance route which is a route through which a guided person is to be guided. The influence level calculation unit 103 calculates, based on the information relating to the routes, an influence level on a guided person in a case in which the guided person deviates from the acquired guidance route, with respect to each branch place at which the guidance route branches into a route different from the guidance route. The information output unit 106 outputs the calculated influence level.

Other Example Embodiments

As described above, the guidance assistance apparatus 10 according to the first example embodiment of the present invention can be achieved by the computer apparatus 50 illustrated in FIG. 2. The guidance assistance apparatus 10 can also be achieved by dedicated hardware such as a circuit. The guidance assistance apparatus 10 can also be achieved by a combination of the computer apparatus 50 and dedicated hardware.

Specifically, the guidance route acquisition unit 101, the influence level calculation unit 103 and the information output unit 106 can be achieved by the CPU 501 which executes a program loaded in the RAM 503. The guidance route storage unit 102, the route information storage unit 104 and the route environment storage unit 105 can be achieved by at least one of the RAM 503 and the storage device 504. The guidance route acquisition unit 101, the influence level calculation unit 103, the information output unit 106, the guidance route storage unit 102, the route information storage unit 104 and the route environment storage unit 105 can be achieved by a dedicated circuit.

As described above, the guidance assistance apparatus 11 according to the second example embodiment of the present invention can be achieved by the computer apparatus 50 illustrated in FIG. 2. The guidance assistance apparatus 11 can also be achieved by dedicated hardware such as a circuit. The guidance assistance apparatus 11 can also be achieved by a combination of the computer apparatus 50 and dedicated hardware.

Specifically, the guidance route acquisition unit 101, the influence level calculation unit 103, the information output unit 106 and the guidance position determination unit 107 can be achieved by the CPU 501 which executes a program loaded in the RAM 503. The guidance route storage unit 102, the route information storage unit 104 and the route environment storage unit 105 can be achieved by at least one of the RAM 503 and the storage device 504. The guidance route acquisition unit 101, the influence level calculation unit 103, the information output unit 106, the guidance position determination unit 107, the guidance route storage unit 102, the route information storage unit 104 and the route environment storage unit 105 can be achieved by a dedicated circuit.

As described above, the guidance assistance apparatus 12 according to the third example embodiment of the present invention can be achieved by the computer apparatus 50 illustrated in FIG. 2. The guidance assistance apparatus 12 can also be achieved by dedicated hardware such as a circuit. The guidance assistance apparatus 12 can also be achieved by a combination of the computer apparatus 50 and dedicated hardware.

Specifically, the guidance route acquisition unit 101, the influence level calculation unit 103, the information output unit 106, the guidance position determination unit 107 and the guiding person determination unit 109 can be achieved by the CPU 501 which executes a program loaded in the RAM 503. The guidance route storage unit 102, the route information storage unit 104, the route environment storage unit 105, the disposition information storage unit 108 and the guiding person information storage unit 110 can be achieved by at least one of the RAM 503 and the storage device 504. The guidance route acquisition unit 101, the influence level calculation unit 103, the information output unit 106, the guidance position determination unit 107 and the guiding person determination unit 109 can be achieved by a dedicated circuit. Similarly, the guidance route storage unit 102, the route information storage unit 104, the route environment storage unit 105, the disposition information storage unit 108 and the guiding person information storage unit 110 can be achieved by a dedicated circuit.

As described above, the guidance assistance apparatus 13 according to the fifth example embodiment of the present invention can be achieved by the computer apparatus 50 illustrated in FIG. 2. The guidance assistance apparatus 13 can also be achieved by dedicated hardware such as a circuit. The guidance assistance apparatus 13 can also be achieved by a combination of the computer apparatus 50 and dedicated hardware.

Specifically, the guidance route acquisition unit 101, the influence level calculation unit 103 and the information output unit 106 can be achieved by the CPU 501 which executes a program loaded in the RAM 503. The guidance route acquisition unit 101, the influence level calculation unit 103 and the information output unit 106 can be achieved by a dedicated circuit.

Although a part or all of the above-described example embodiments can also be described as the Supplementary Note described below, the example embodiments are not limited to the following.

Supplementary Note 1

A guidance assistance apparatus including:
guidance route acquisition means for acquiring a guidance route through which a guided person is to be guided from routes from a start-point position to an end-point position;
influence level calculation means for calculating, based on information relating to the routes, an influence level on the guided person in a case in which the guided person deviates from the acquired guidance route, with respect to each of branch places at which the guidance route branches into a route different from the guidance route; and information output means for outputting the calculated influence level.

Supplementary Note 2

The guidance assistance apparatus according to Supplementary Note 1, wherein
the information output means outputs the guidance route and the information relating to the routes.

Supplementary Note 3

The guidance assistance apparatus according to Supplementary Note 1 or 2, wherein
the information output means outputs guidance information based on the influence level, the guidance route and the information relating to the routes, the guidance information being information for guiding the guided person to the guidance route.

Supplementary Note 4

The guidance assistance apparatus according to any one of Supplementary Notes 1 to 3, further including
guidance position determination means for determining, based on the influence level for each of the branch places, a guidance position from the branch places, the guidance position being a position at which the guided person is to be guided, wherein
the information output means outputs the guidance position.

Supplementary Note 5

The guidance assistance apparatus according to Supplementary Note 4, wherein
the information output means outputs guidance assistance information based on the guidance route, the information relating to the routes, and the guidance position, the guidance assistance information being information for guiding the guided person to the guidance route at the guidance position.

Supplementary Note 6

The guidance assistance apparatus according to Supplementary Note 4 or 5, further including
guiding person determination means for determining a target guiding person based on the guidance position and information relating to a guiding person, the target guiding person being a guiding person that is to conduct guidance at the guidance position, wherein
the information output means outputs target guiding person information which is information relating to the target guiding person.

Supplementary Note 7

The guidance assistance apparatus according to Supplementary Note 6, wherein
the information output means outputs guidance instruction information based on the guidance route, the information relating to the routes, the guidance position and the target guiding person information, the guidance instruction information being information for guiding the target guiding person to the guidance position.

Supplementary Note 8

A guidance assistance system including the guidance assistance apparatus of any one of Supplementary Notes 1 to 7, the guidance assistance system including
an information processing apparatus including display means for displaying the influence level which is output.

Supplementary Note 9

A guidance assistance method including:
acquiring a guidance route through which a guided person is to be guided from routes from a start-point position to an end-point position;
calculating, based on information relating to the routes, an influence level on the guided person in a case in which the guided person deviates from the acquired guidance route, with respect to each of branch places at which the guidance route branches into a route different from the acquired route; and
outputting the calculated influence level.

Supplementary Note 10

The guidance assistance method according to Supplementary Note 9, wherein
the outputting includes outputting the guidance route and the information relating to the routes.

Supplementary Note 11

The guidance assistance method according to Supplementary Note 9 or 10, wherein
the outputting includes outputting guidance information based on the influence level, the guidance route and the information relating to the routes, the guidance information being information for guiding the guided person to the guidance route.

Supplementary Note 12

The guidance assistance method according to any one of Supplementary Notes 9 to 11, including
determining, based on the influence level for each of the branch places, a guidance position from the branch places, the guidance position being a position at which the guided person is to be guided, wherein
the outputting includes outputting the guidance position.

Supplementary Note 13

The guidance assistance method according to Supplementary Note 12, wherein
the outputting includes outputting guidance assistance information based on the guidance route, the information relating to the routes, and the guidance position, the guidance assistance information being information for guiding the guided person to the guidance route at the guidance position.

Supplementary Note 14

The guidance assistance method according to Supplementary Note 12 or 13, further including
guiding person determination means for determining a target guiding person based on the guidance position and information relating to a guiding person, the target guiding person being a guiding person that is to conduct guidance at the guidance position, wherein the outputting includes outputting target guiding person information which is information relating to the target guiding person.

Supplementary Note 15

The guidance assistance method according to Supplementary Note 14, wherein the outputting includes outputting guidance instruction information based on the guidance route, the information relating to the routes, the guidance position and the target guiding person information, the guidance instruction information being information for guiding the target guiding person to the guidance position.

Supplementary Note 16

The guidance assistance method according to any one of Supplementary Notes 9 to 15, including displaying the influence level which is output.

Supplementary Note 17

A storage medium for storing a program which causes a computer to execute:

a guidance route acquisition process of acquiring a guidance route through which a guided person is to be guided from routes from a start-point position to an end-point position;

an influence level calculation process of calculating, based on information relating to the routes, an influence level on the guided person in a case in which the guided person deviates from the acquired guidance route, with respect to each of branch places at which the guidance route branches into a route different from the guidance route; and an information output process of outputting the calculated influence level.

Supplementary Note 18

The storage medium according to Supplementary Note 17, wherein the information output process outputs the guidance route and the information relating to the routes.

Supplementary Note 19

The storage medium according to Supplementary Note 17 or 18, wherein the information output process outputs guidance information based on the influence level, the guidance route and the information relating to the routes, the guidance information being information for guiding the guided person to the guidance route.

Supplementary Note 20

The storage medium according to any one of Supplementary Note 17 to 19, wherein the program causes the computer to further execute a guidance position determination process of determining, based on the influence level for each of the branch places, a guidance position from the branch places, the guidance position being a position at which the guided person is to be guided, wherein the information output process outputs the guidance position.

Supplementary Note 21

The storage medium according to Supplementary Note 20, wherein the information output process outputs guidance assistance information based on the guidance route, the information relating to the routes, and the guidance position, the guidance assistance information being information for guiding the guided person to the guidance route at the guidance position.

Supplementary Note 22

The storage medium according to Supplementary Note 20 or 21, wherein the program causes the computer to further execute a guiding person determination process of determining a target guiding person based on the guidance position and information relating to a guiding person, the target guiding person being a guiding person that is to conduct guidance at the guidance position, wherein the information output process outputs target guiding person information which is information relating to the target guiding person.

Supplementary Note 23

The storage medium according to Supplementary Note 22, wherein the information output process outputs guidance instruction information based on the guidance route, the information relating to the routes, the guidance position and the target guiding person information, the guidance instruction information being information for guiding the target guiding person to the guidance position.

The present invention is not limited to the above-described example embodiments, and various modifications can be made appropriately without departing from the scope of the present invention.

REFERENCE SIGNS LIST

1 Guidance assistance system
10, 11, 12, 13 Guidance assistance apparatus
20 Terminal
30 Administrator apparatus
50 Computer apparatus
101 Guidance route acquisition unit
102 Guidance route storage unit
103 Influence level calculation unit
104 Route information storage unit
105 Route environment storage unit
106 Information output unit
107 Guidance position determination unit
108 Disposition information storage unit
109 Guiding person determination unit
110 Guiding person information storage unit
200 Start/end-point information
501 CPU
502 ROM
503 RAM
504 Storage device
505 Drive device
506 Communication interface 507 Input/output interface
508 Program
509 Storage medium
510 Network

The invention claimed is:

1. A guidance assistance method comprising:
acquiring a guidance route through which a guided person is to be guided from routes from a start-point position to an end-point position;
calculating, based on information relating to the routes, an influence level of deviation from the guidance route for each of branch places of the guidance route;
detecting a terminal device existing within a predetermined range from the branch place for which a maximum influence level is calculated;
determining, based on disposition information, a guiding person disposed to the branch place;
outputting information on the guiding person to the terminal device; and
outputting another information for guidance to another terminal device of the guiding person.

2. The guidance assistance method according to claim 1, wherein
the another terminal device is configured to:
obtain information relating to a traffic volume; and
estimate the traffic volume based on the information obtained by a sensor.

3. The guidance assistance method according to claim 1, wherein
the calculating includes calculating, as the influence level, a value based on a tendency for deviation from the guidance route to occur at a branch place and an influence of the deviation.

4. The guidance assistance method according to claim 3, wherein
the influence level is further based on an influence of taking a route other than the guidance route.

5. The guidance assistance method according to claim 3, wherein
the tendency is based on a traffic volume of the guidance route and a traffic volume of a route other than the guidance route.

6. The guidance assistance method according to claim 3, wherein
the tendency is based on a probability of the deviation at the branch place, the probability depending on complexity of a structure of the branch place.

7. A guidance assistance system comprising:
at least one memory that stores instructions; and
at least one processor configured to execute the instructions to:
acquire a guidance route through which a guided person is to be guided from routes from a start-point position to an end-point position;
calculate, based on information relating to the routes, an influence level of deviation from the guidance route for each of branch places of the guidance route;
detect a terminal device existing within a predetermined range from the branch place for which a maximum influence level is calculated;
determine, based on disposition information, a guiding person disposed to the branch place;
output information on the guiding person to the terminal device; and
output another information for guidance to another terminal device of the guiding person.

8. The guidance assistance system according to claim 7, wherein the another terminal device is configured to:
obtain information relating to a traffic volume; and
estimate the traffic volume based on the information obtained by a sensor.

9. The guidance assistance system according to claim 7, wherein
the at least one processor is further configured to
calculate, as the influence level, a value based on a tendency for deviation from the guidance route to occur at a branch place and an influence of the deviation.

10. The guidance assistance system according to claim 9, wherein
the influence level is further based on an influence of taking a route other than the guidance route.

11. The guidance assistance system according to claim 9, wherein
the tendency is based on a traffic volume of the guidance route and a traffic volume of a route other than the guidance route.

12. The guidance assistance system according to claim 9, wherein
the tendency is based on a probability of the deviation at the branch place, the probability depending on complexity of a structure of the branch place.

13. A non-transitory computer readable storage medium storing a program causing a computer to execute:
processing of acquiring a guidance route through which a guided person is to be guided from routes from a start-point position to an end-point position;
processing of calculating, based on information relating to the routes, an influence level of deviation from the guidance route for each of branch places of the guidance route;
processing of detecting a terminal device existing within a predetermined range from the branch place for which a maximum influence level is calculated;
processing of determining, based on disposition information, a guiding person disposed to the branch place;
processing of outputting information on the guiding person to the terminal device; and
processing of outputting another information for guidance to another terminal device of the guiding person.

14. The storage medium according to claim 13, wherein the another terminal device is configured to:
obtain information relating to a traffic volume; and
estimate the traffic volume based on the information obtained by a sensor.

15. The storage medium according to claim 13, wherein
the processing of calculating calculates, as the influence level, a value based on a tendency for deviation from the guidance route to occur at a branch place and an influence of the deviation.

16. The storage medium according to claim 15, wherein
the influence level is further based on an influence of taking a route other than the guidance route.

17. The storage medium according to claim 15, wherein
the tendency is based on a traffic volume of the guidance route and a traffic volume of a route other than the guidance route.

18. The storage medium according to claim 15, wherein
the tendency is based on a probability of the deviation at the branch place, the probability depending on complexity of a structure of the branch place.

* * * * *